US011077735B2

(12) United States Patent
Aikawa et al.

(10) Patent No.: US 11,077,735 B2
(45) Date of Patent: Aug. 3, 2021

(54) HEATING APPARATUS OF VEHICLE

(71) Applicant: TOYOTA JIDOSHA KABUSHIKI KAISHA, Toyota (JP)

(72) Inventors: Hidefumi Aikawa, Sunto-gun (JP); Kei Okamoto, Toyota (JP); Minoru Ohmikawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 16/373,724

(22) Filed: Apr. 3, 2019

(65) Prior Publication Data

US 2020/0009941 A1 Jan. 9, 2020

(30) Foreign Application Priority Data

Jul. 4, 2018 (JP) .............................. JP2018-127419

(51) Int. Cl.
*B60H 1/03* (2006.01)
*B60H 1/00* (2006.01)
(Continued)

(52) U.S. Cl.
CPC ......... *B60H 1/034* (2013.01); *B60H 1/00328* (2013.01); *B60H 1/00342* (2013.01);
(Continued)

(58) Field of Classification Search
CPC ........................... B60H 1/034; B60H 1/00328; B60H 1/00342; B60H 1/00885; B60H 1/06;
(Continued)

(56) References Cited

U.S. PATENT DOCUMENTS

2013/0226380 A1 8/2013 Ando et al.
2015/0210141 A1* 7/2015 Ragazzi ............. B60H 1/00907
62/93

(Continued)

FOREIGN PATENT DOCUMENTS

JP 2007-223418 A 9/2007
JP 2013-177026 A 9/2013
(Continued)

*Primary Examiner* — Kenneth J Hansen
*Assistant Examiner* — Phillip Decker
(74) *Attorney, Agent, or Firm* — Oliff PLC

(57) ABSTRACT

A heating apparatus of the invention executes a first heating control for heating a heater core by a heat generation device when a process of heating the heater core is requested while an engine operation is stopped. The heating apparatus executes a second heating control for heating the cooling water which cooled an internal combustion engine, by the heat generation device and supplying the heated cooling water to the heater core when a heater core temperature is not increased to a requested temperature only by the heat generation device. The heating apparatus executes a third heating control for stopping the engine operation, heating the cooling water which cooled the internal combustion engine, by the heat generation device, and supplying the heated cooling water to the heater core when an engine temperature becomes equal to or higher than a predetermined temperature while the second heating control is executed.

12 Claims, 21 Drawing Sheets

(51) Int. Cl.
*B60H 1/06* (2006.01)
*B60H 1/22* (2006.01)

(52) U.S. Cl.
CPC ..... *B60H 1/00385* (2013.01); *B60H 1/00885* (2013.01); *B60H 1/00899* (2013.01); *B60H 1/06* (2013.01); *B60H 2001/00307* (2013.01); *B60H 2001/2253* (2013.01)

(58) Field of Classification Search
CPC .. B60H 2001/00307; B60H 2001/2253; B60H 1/00899
See application file for complete search history.

(56) References Cited

U.S. PATENT DOCUMENTS

2017/0368911 A1* 12/2017 Okamoto ............... B60H 1/025
2018/0029439 A1* 2/2018 Jeong .................... B60W 10/30

FOREIGN PATENT DOCUMENTS

| JP | 2014-129054 A | * | 7/2014 | |
|---|---|---|---|---|
| JP | 2014-129054 A | | 7/2014 | |
| JP | 5545284 B2 | * | 7/2014 | ........... B60H 1/2218 |

* cited by examiner

HEATING APPARATUS OF VEHICLE

BACKGROUND

Field

The invention relates to a heating apparatus for heating an interior space of a vehicle.

Description of the Related Art

There is known a heating apparatus for heating an interior space of a hybrid vehicle (for example, see JP 2014-129054 A). The heating apparatus includes a heater core as a heat source for heating the interior space of the vehicle. The heating apparatus supplies cooling water, having a temperature increased by cooling an internal combustion engine, to the heater core and supplies the cooling water, having a temperature increased by an electric heater, to the heater core. The heater core is heated by heat of the cooling water supplied to the heater core.

In the hybrid vehicle, when a driving force required for moving the hybrid vehicle is small, an operation of the internal combustion engine is stopped, and the driving force generated by an electric motor drives the hybrid vehicle. Hereinafter, the driving force required for moving the hybrid vehicle will be referred to as "the required driving force", and the operation of the internal combustion engine will be referred to as "the engine operation".

When a process of heating an interior space of the hybrid vehicle is requested while the required driving force is small, and the engine operation is stopped, the heating apparatus supplies the cooling water heated by the electric heater to the heater core. Thereby, the heater core is heated by the supplied cooling water. In this case, the engine operation is stopped. Thus, the cooling water which cooled the internal combustion engine, is not supplied to the heater core.

When the electric heater cannot generate an amount of the heat corresponding to an amount of the heat required to be supplied to the heater core, the engine operation is started to supply the cooling water cooled by the internal combustion engine to the heater core. Thereby, the heater core is heated by the cooling water heated by the electric heater and the cooling water having the temperature increased by cooling the internal combustion engine. Hereinafter, the amount of the heat required to be supplied to the heater core will be referred to as "the required heat amount".

The internal combustion engine is operated when the amount of the heat generated by the electric heater is less than the required heat amount if the engine operation is stopped. Thus, an amount of fuel consumed by the engine operation is large, compared to when the internal combustion engine is not operated even when the amount of the heat generated by the electric heater is less than the required heat amount.

SUMMARY

The invention has been made for solving problems mentioned above. An object of the invention is to provide a heating apparatus of the vehicle which accomplishes a small amount of the fuel consumed by the internal combustion engine is small for heating the interior space of the vehicle.

A vehicle heating apparatus according to the invention is an apparatus for heating an interior space (101) of a vehicle (100).

The vehicle heating apparatus according to the invention comprises a heater core (32), a heat generation device (60), at least one pump (11, 31), and an electronic control unit (90).

The heater core (32) is used for heating an air to be supplied to the interior space (101).

The heat generation device (60) generates heat by using electric power. The at least one pump (11, 31) is used for flowing cooling water.

The electronic control unit (90) controls an activation of the heat generation device (60), an operation of an internal combustion engine (110) of the vehicle (100), and an activation of the at least one pump (11, 31).

The electronic control unit (90) is configured to execute a first heating control for activating the heat generation device (60) to heat the heater core (32) by the heat generated by the heat generation device (60) (see processes of a step 1510 and steps 1575 to 1590 in FIG. 15) when a process of heating the heater core (32) is requested (see determinations "Yes" at steps 1225 and 1230 in FIG. 12, respectively) while the operation of the internal combustion engine (110) is stopped (see a determination "Yes" at a step 1505 and a determination "No" at a step 1515 in FIG. 15).

The electronic control unit (90) is further configured to execute a second heating control for activating the heat generation device (60), operating the internal combustion engine (110), and activating the at least one pump (11, 31) to heat the cooling water which cooled the internal combustion engine (110), by the heat generated by the heat generation device (60), supply the heated cooling water to the heater core (32), and heat the heater core (32) by the supplied cooling water (see the process of the step 1510 and processes of a step 1540 and steps 1560 to 1570 in FIG. 15) when a temperature of the heater core (32) is not increased to a requested temperature only by the heat generated by the heat generation device (60) (see a determination "Yes" at a step 1515 in FIG. 15).

The electronic control unit (90) is further configured to execute a third heating control for continuing the activation of the heat generation device (60), stopping the operation of the internal combustion engine (110), and continuing the activation of the at least one pump (11, 31) to heat the cooling water which cooled the internal combustion engine (110), by the heat generated by the heat generation device (60), supply the heated cooling water to the heater core (32), and heat the heater core (32) by the supplied cooling water (see the process of the step 1510, a process of a step 1550, and the processes of the steps 1560 to 1570 in FIG. 15) when a temperature of the internal combustion engine (110) becomes equal to or higher than a predetermined temperature while the electronic control unit (90) executes the second heating control (see a determination "No" at a step 1535 in FIG. 15).

When the temperature of the internal combustion engine becomes equal to or higher than the predetermined temperature, the temperature of the internal combustion engine is sufficiently high. Therefore, even when the operation of the internal combustion engine is stopped, the temperature of the cooling water supplied to the heater core can be maintained at a sufficiently high temperature by continuing the activation of the at least one pump to heat the cooling water which cooled the internal combustion engine, by the heat generation device and supply the heated cooling water to the heater core. On the other hand, an amount of fuel consumed by the internal combustion engine can be reduced by stopping the operation of the internal combustion engine.

The vehicle heating apparatus according to the invention stops the operation of the internal combustion engine and continues the activation of the at least one pump to heat the cooling water which cooled the internal combustion engine, by the heat generation device and supply the heated cooling water to the heater core when the temperature of the internal combustion engine becomes equal to or higher than the predetermined temperature. Therefore, the temperature of the cooling water supplied to the heater core is maintained at the sufficiently high temperature. Thus, the heater core can be heated sufficiently, and the amount of the fuel consumed by the internal combustion engine can be reduced.

According to an aspect of the invention, the predetermined temperature may be set to a temperature equal to or higher than the temperature of the internal combustion engine (110) which is warmed completely. When the predetermined temperature is set to the temperature equal to or higher than the temperature of the internal combustion engine which is warmed completely, the temperature of the internal combustion engine at a time of starting to execute the third heating control, is likely to be a temperature capable of heating the heater core sufficiently. Thus, the heater core is likely to be heated sufficiently.

According to another aspect of the invention, the electronic control unit (90) may be configured to set a target output power of the heat generation device (60) on the basis of a difference of the temperature of the heater core relative to the requested temperature when the electronic control unit (90) executes the first heating control (see the process of the step 1510 in FIG. 15). In this case, the electronic control unit (90) may be further configured to maintain the target output of the heat generation device (60) at a constant value while the electronic control unit (90) executes the second heating control (see a process of a step 2125 in FIG. 21).

In this case, the output of the heat generation device in executing the second heating control, is a maximum output and cannot heat the heater core to increase the temperature of the heater core to the requested temperature only by the heat generated by the heat generation device. However, when the second heating control is executed, the cooling water which cooled the internal combustion engine, is heated by the heat generation device, and the heated cooling water is supplied to the heater core. Thus, the temperature of the heater core can be increased at a large increasing rate.

According to further another aspect of the invention, the vehicle heating apparatus may comprise a heat pump (60) including a compressor (63) as the heat generation device.

In this case, the electronic control unit (90) is configured to execute the first heating control for activating the compressor (63) to cause the heat pump (60) to generate the heat and heat the heater core (32) by the heat generated by the heat pump (60) (see the processes of the step 1510 and the steps 1575 to 1590 in FIG. 15) when the process of heating the heater core (32) is requested, and an outside air temperature (Ta) is equal to or higher than a predetermined outside air temperature (Ta_th) while the operation of the internal combustion engine (110) (see the determinations "Yes" at the steps 1225 and 1230 in FIG. 12, respectively, the determination "Yes" at the step 1505 in FIG. 15, and the determination "No" at the step 1515 in FIG. 15).

On the other hand, the electronic control unit (90) is configured to execute a fourth heating control for operating the internal combustion engine (110) and activating the at least one pump (11, 31) to supply the cooling water which cooled the internal combustion engine (110), to the heater core (32) and heat the heater core (32) by the supplied cooling water (see processes of steps 1610 to 1635 in FIG. 16) when the process of heating the heater core (32) is requested, and the outside air temperature (Ta) is lower than the predetermined outside air temperature (Ta_th) while the operation of the internal combustion engine (110) is stopped (see the determination "Yes" at the step 1225 and a determination "No" at the step 1230 in FIG. 12).

Even when the compressor of the heat pump is activated while the temperature of the outside air is low, in particular, the temperature of the outside air is lower than zero degrees C., the temperature of the cooling water may not be increased by the heat pump, or an increased amount of the temperature of the cooling water by the heat pump may be small.

According to this aspect of the invention, when the temperature of the outside air is lower than the predetermined outside air temperature, the fourth heating control is executed to supply the cooling water having a temperature increased by cooling the internal combustion engine, to the heater core. Thus, the heater core can be heated even when the temperature of the outside air is considerably low.

According to further another aspect of the invention, the electronic control unit (90) may be configured to stop the activation of the compressor (63) (see the process of the step 1635 in FIG. 16) when the electronic control unit (90) executes the fourth heating control.

According to further another aspect of the invention, the electronic control unit (90) may be configured to stop the activation of the heat generation device (60) (see a process of a step 1530 in FIG. 15) when the difference of the temperature of the heater core (32) relative to the requested temperature becomes equal to or smaller than a predetermined temperature difference after the electronic control unit (90) starts to execute the third heating control (see a determination "No" at a step 1520 in FIG. 15).

When the third heating control is executed, the temperature of the internal combustion engine has reached the predetermined temperature. Thus, the cooling water is heated by the internal combustion engine sufficiently. The temperature of the heater core is likely to be increased to the requested temperature by continuing to activate the at least one pump to supply the cooling water which cooled the internal combustion engine, to the heater core although the activation of the heat generation device is stopped when the difference of the temperature of the heater core relative to the requested temperature decreases while the third heating control is executed. In addition, an amount of electric power consumed by activating the heat generation device is reduced by stopping the activation of the heat generation device.

According to this aspect of the invention, the activation of the at least one pump is continued although the activation of the heat generation device is stopped when the difference of the temperature of the heater core relative to the requested temperature becomes equal to or smaller than the predetermined temperature difference. Therefore, the cooling water having a temperature increased by cooling the internal combustion engine, is supplied to the heater core. Thus, the heater core can be heated, and the amount of the electric power consumed by activating the heat generation device can be reduced.

According to further another aspect of the invention, the electronic control unit (90) may be configured to activate the at least one pump (11, 31) to heat the cooling water by the heat generated by the heat generation device (60), supply the heated cooling water to the heater core (32), and heat the heater core (32) by the supplied cooling water when the electronic control unit (90) executes the first heating control.

According to further another aspect of the invention, the vehicle heating apparatus may comprise an engine water circulation passage (20) for flowing the cooling water supplied to the internal combustion engine (110), a heating water circulation passage (40) for flowing the cooling water supplied to the heater core (32), and a connection device (50) for connecting the engine water circulation passage (20) to the heating water circulation passage (40). In this case, the electronic control unit (90) is configured to control an activation of the connection device (50) to connect the engine water circulation passage (20) to the heating water circulation passage (40) when the electronic control unit (90) executes the first heating control, the second heating control, and the third heating control, respectively.

According to further another aspect of the invention, the electronic control unit (90) may be configured to control an activation of the connection device (50) to connect the engine water circulation passage (20) to the heating water circulation passage (40) when the electronic control unit (90) executes the fourth heating control.

According to further another aspect of the invention, the at least one pump (11) may be provided in the engine water circulation passage (20). Alternatively, the at least one pump (32) may be provided in the heating water circulation passage (40).

When the at least one pump (32) may be provided in the heating water circulation passage (40), the vehicle heating apparatus may comprise another pump (11) provided in the engine water circulation passage (20) for flowing the cooling water.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
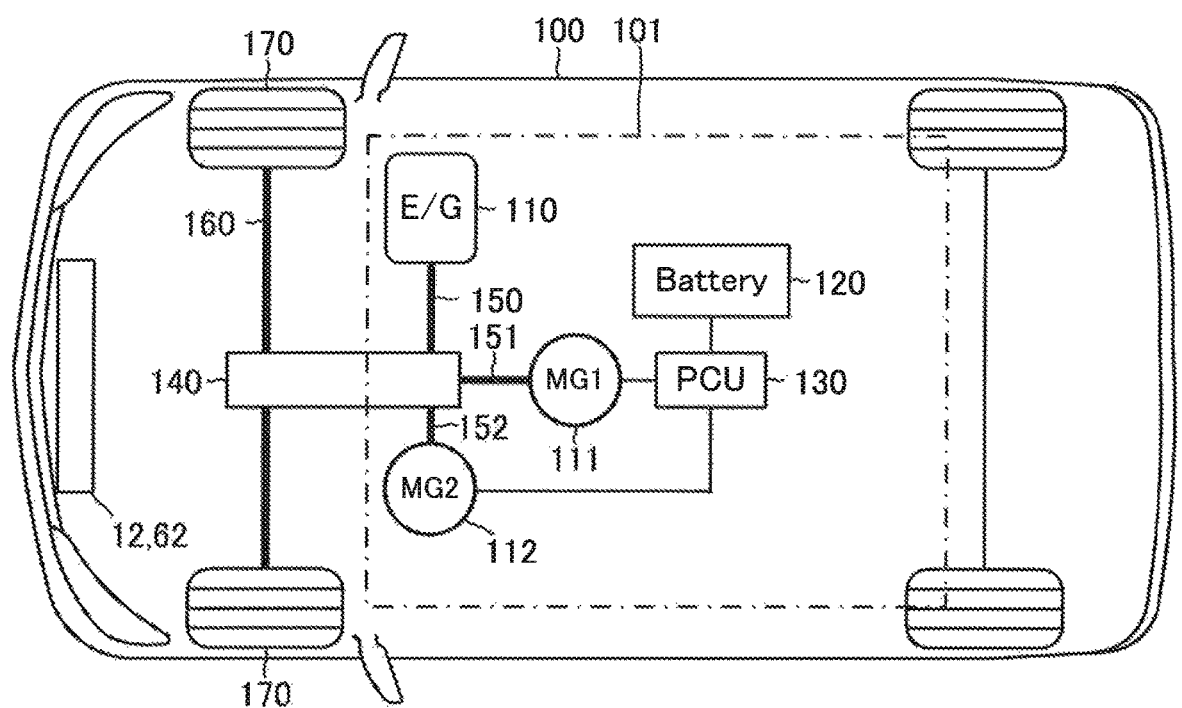
FIG. 1 is a view for showing a vehicle, to which a heating apparatus of a vehicle according to an embodiment of the invention is applied.

Below, a heating apparatus of a vehicle according to an embodiment of the invention will be described with reference to the drawings. Hereinafter, the heating apparatus of the vehicle according to the embodiment will be referred to as "the embodiment apparatus". The embodiment apparatus is mounted on a vehicle 100 shown in FIG. 1. An internal combustion engine 110, a rechargeable battery 120, and a hybrid device are mounted on the vehicle 100 as a vehicle driving system for supplying the vehicle 100 with driving force for driving the vehicle 100.

The hybrid device includes a first motor generator 111, a second motor generator 112, a power control unit 130, and a power distribution mechanism 140. The power control unit 130 includes an inverter 131 (see FIG. 2), a boost converter, a DC/DC converter, etc. Hereinafter, the power control unit 130 will be referred to as "the PCU 130".

The vehicle 100 is a so-called hybrid vehicle which is driven by power output from the engine 110, and the first motor generator 111, and the second motor generator 112. In this regard, the vehicle 100, to which the embodiment apparatus is applied, may be a so-called plug-in hybrid vehicle in which the battery 120 can be charged by an outside electric power source. Further, the vehicle 100, to which the embodiment apparatus is applied, may be a hybrid vehicle which includes only one motor generator as the hybrid device and may be driven by the power output from the motor generator and the engine 110. Furthermore, the vehicle 100, to which the embodiment apparatus is applied, may be a hybrid vehicle which includes single motor generator as the hybrid device, is driven by the power output from the single motor generator, and uses the power output from the engine 110 to generate electric power by an electric power generator.

Further, the vehicle 100, to which the embodiment apparatus applied, may be a vehicle which does not include a motor generator as a driving force source for generating the power for driving the vehicle 100, and is configured to stop an operation of the internal combustion engine when the brake pedal is operated, and a moving speed of the vehicle is zero and start the operation of the internal combustion engine when the acceleration pedal is operated.

The power distribution mechanism 140 is, for example, a planetary gear mechanism. The power distribution mechanism 140 divides an engine torque into a torque for rotating an output shaft of the power distribution mechanism 140 and a torque for driving the first motor generator 111 as the electric generator with a predetermined proportion or a predetermined division property. The engine torque is a torque input into the power distribution mechanism 140 from the engine 110 through an output shaft 150.

The power distribution mechanism 140 transmits the engine torque and a torque input into the power distribution mechanism 140 from the second motor generator 112, to right and left front wheels 170 through a wheel drive shaft 160. Hereinafter, the right and left front wheels 170 will be referred to as "driving wheels 170". The power distribution mechanism 140 is known (for example, see JP 2013-177026 A).

The first and second motor generators 111 and 112 are permanent magnet synchronous motors, respectively and electrically connected to the battery 120 via the inverter 131 of the PCU 130.

The first motor generator 111 is operatively connected to the power distribution mechanism 140 via an input/output shaft 151. The first motor generator 111 is mainly used as the electric generator. When the first motor generator 111 is used as the electric generator, a rotation shaft of the first motor generator 111 is rotated to generate the electric power by an external force such as a moving energy of the vehicle 100 and the engine torque. The generated electric power is supplied to the battery 120 through the inverter 131 of the PCU 130 and stored in the battery 120. The first motor generator 111 is also used as the electric motor. When the first motor generator 111 is used as the electric motor, the first motor generator 111 is driven by the electric power supplied from the battery 120 through the inverter 131 of the PCU 130.

The second motor generator 112 is operatively connected to the power distribution mechanism 140 via an input/output shaft 152. The second motor generator 112 is mainly used as the electric motor. When the second motor generator 112 is used as the electric motor, the second motor generator 112 is driven by the electric power supplied from the battery 120 through the inverter 131 of the PCU 130. The second motor generator 112 is also used as the electric generator. When the second motor generator 112 is used as the electric generator, a rotation shaft of the second motor generator 112 is rotated to generate the electric power by the external force. The generated electric power is supplied to the battery 120 through the inverter 131 of the PCU 130 and stored in the battery 120.

Figure 2:
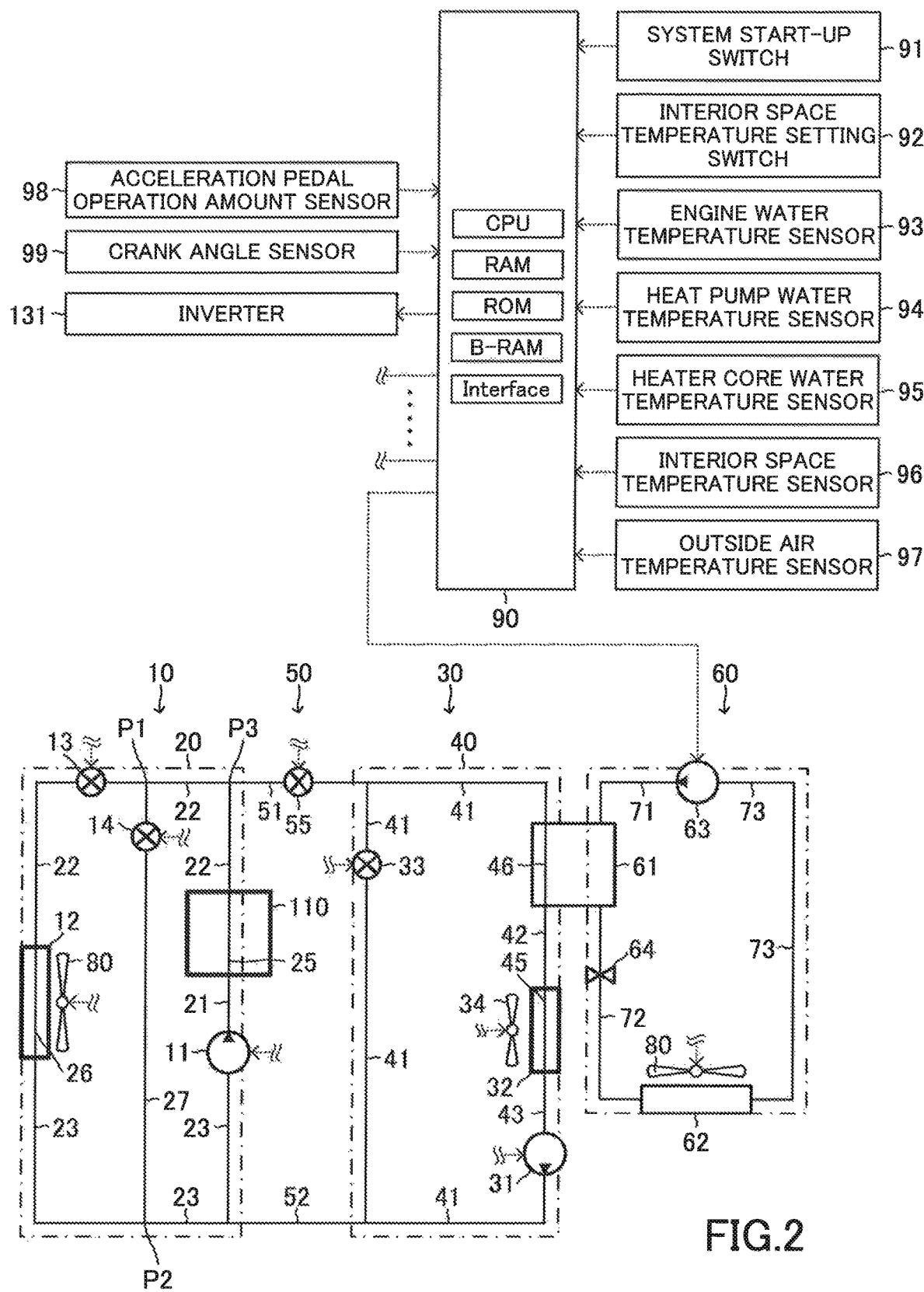
FIG. 2 is a view for showing the heating apparatus of the vehicle according to the embodiment of the invention.

As shown in FIG. 2, the inverter 131 is electrically connected to an ECU 90. The ECU 90 is an electronic control unit which is an electronic control circuit including a micro-computer as a main component including a CPU, a ROM, a RAM, a buck-up RAM, an interface, etc. The CPU realizes various functions described later by executing instructions or routines stored in a memory such as the ROM.

An operation of the inverter 131 is controlled by the ECU 90. The ECU 90 controls operations of the first and second motor generators 111 and 112 by controlling the operation of the inverter 131.

As shown in FIG. 2, the embodiment apparatus includes an engine temperature control device 10, a heating control device 30, a connection device 50, a heat pump 60, and a heat exchanging fan 80.

<Engine Temperature Control Device>

The engine temperature control device 10 includes an engine pump 11, a radiator 12, an engine water passage shut-off valve 13, a bypass control valve 14, and an engine water circulation passage 20.

Below, the embodiment apparatus will be described by using cooling water as a liquid flowing in the engine water circulation passage 20 and a heating water circulation passage 40. In this regard, the liquid may be a heat exchanging liquid which has heat exchanging function.

The engine water circulation passage 20 is formed by first to third engine water passages 21 to 23, an engine internal water passage 25, a radiator water passage 26, a bypass water passage 27, and an internal water passage (not shown) of the engine pump 11.

The engine internal water passage 25 is a passage, through which the cooling water flows. The engine internal water passage 25 is formed in the engine 110. The radiator water passage 26 is a passage, through which the cooling water flows. The radiator water passage 26 is formed in the radiator 12.

The first engine water passage 21 is a passage, through which the cooling water flows. The first engine water passage 21 fluidically connects a discharging opening of the engine pump 11 to an inlet of the engine internal water passage 25. The second engine water passage 22 is a passage, through which the cooling water flows. The second engine water passage 22 fluidically connects an outlet of the engine internal water passage 25 to an inlet of the radiator water passage 26. The third engine water passage 23 is a passage, through which the cooling water flows. The third engine water passage 23 fluidically connects an outlet of the radiator water passage 26 to a suctioning opening of the engine pump 11. The bypass water passage 27 is a passage, through which the cooling water flows. The bypass water passage 27 fluidically connects the second engine water passage 22 to the third engine water passage 23.

The engine water passage shut-off valve 13 is provided at the second engine water passage 22 between the inlet of the radiator water passage 26 and a connection portion P1, at which the bypass water passage 27 is fluidically connected to the second engine water passage 22. The engine water passage shut-off valve 13 is electrically connected to the ECU 90. A setting position of the engine water passage shut-off valve 13 is controlled by the ECU 90. When the engine water passage shut-off valve 13 is set at an open position, the cooling water can flow through the engine water passage shut-off valve 13. On the other hand, when the engine water passage shut-off valve 13 is set at a closed position, the cooling water cannot flow through the engine water passage shut-off valve 13.

The bypass control valve 14 is provided at the bypass water passage 27. The bypass control valve 14 is electrically connected to the ECU 90. A setting position of the bypass control valve 14 is controlled by the ECU 90. When the bypass control valve 14 is set at an open position, the cooling water can flow through the bypass control valve 14. On the other hand, when the bypass control valve 14 is set at a closed position, the cooling water cannot flow through the bypass control valve 14.

The engine pump 11 is electrically connected to the ECU 90. An activation of the engine pump 11 is controlled by the ECU 90.

The heat exchanging fan 80 is provided near the radiator 12 and an outside air heat exchanger 62 described later such that the heat exchanging fan 80 supplies air to the radiator 12 and the outside air heat exchanger 62 when the heat exchanging fan 80 is activated. The heat exchanging fan 80 is electrically connected to the ECU 90. An activation of the heat exchanging fan 80 is controlled by the ECU 90. In the drawings, the heat exchanging fans 80 are illustrated near the radiator 12 and the outside air heat exchanger 62, respectively. However, the heat exchanging fan 80 is common for the radiator 12 and the outside air heat exchanger 62.

<Heating Control Device>

The heating control device 30 includes a heating pump 31, a heater core 32, a heating water passage shut-off valve 33, a heating fan 34, and the heating water circulation passage 40.

The heating water circulation passage 40 is formed by first to third heating water passages 41 to 43, a heater core water passage 45, a condenser water passage 46, and an internal water passage (not shown) of the heating pump 31.

The heater core water passage 45 is a passage, through which the cooling water flows. The heater core water passage 45 is formed in the heater core 32. The condenser water passage 46 is a passage, through which the cooling water flows. The condenser water passage 46 is formed in a condenser 61 of the heat pump 60 described later.

The first heating water passage 41 is a passage, through which the cooling water flows. The first heating water passage 41 fluidically connects a discharging opening of the heating pump 31 to an inlet of the condenser water passage 46. The second heating water passage 42 is a passage, through which the cooling water flows. The second heating water passage 42 fluidically connects an outlet of the condenser water passage 46 to an inlet of the heater core water passage 45. The third heating water passage 43 is a passage, through which the cooling water flows. The third heating water passage 43 fluidically connects an outlet of the heater core water passage 45 to a suctioning opening of the heating pump 31.

The heating water passage shut-off valve 33 is provided at the first heating water passage 41. The heating water passage shut-off valve 33 is electrically connected to the ECU 90. A setting position of the heating water passage shut-off valve 33 is controlled by the ECU 90. When the heating water passage shut-off valve 33 is set at an open position, the cooling water can flow through the heating water passage shut-off valve 33. On the other hand, when the heating water passage shut-off valve 33 is set at a closed position, the cooling water cannot flow through the heating water passage shut-off valve 33.

The heating fan 34 is provided near the heater core 32 such that the heating fan 34 supplies the air to the heater core 32 when the heating fan 34 is activated. The heating fan 34 is electrically connected to the ECU 90. An activation of the heating fan 34 is controlled by the ECU 90.

<Connection Device>

The connection device 50 includes a first connection water passage 51, a second connection water passage 52, and a connection water passage shut-off valve 55.

An end of the first connection water passage 51 is fluidically connected to the second engine water passage 22 between the outlet of the engine internal water passage 25 and the connection portion P1, at which the bypass water passage 27 is fluidically connected to the second engine water passage 22. The other end of the first connection water passage 51 is fluidically connected to the first heating water passage 41 between the heating water passage shut-off valve 33 and the inlet of the condenser water passage 46.

The connection water passage shut-off valve 55 is provided at the first connection water passage 51. The connection water passage shut-off valve 55 is electrically connected to the ECU 90. A setting position of the connection water passage shut-off valve 55 is controlled by the ECU 90. When the connection water passage shut-off valve 55 is set at an open position, the cooling water can flow through the connection water passage shut-off valve 55. On the other hand, when the connection water passage shut-off valve 55 is set at a closed position, the cooling water cannot flow through the connection water passage shut-off valve 55.

An end of the second connection water passage 52 is fluidically connected to the third engine water passage 23 between the suctioning opening of the engine pump 11 and a connection portion P2, at which the bypass water passage 27 is fluidically connected to the third engine water passage 23. The other end of the second connection water passage 52 is fluidically connected to the first connection water passage 51 between the discharging opening of the heating pump 31 and the heating water passage shut-off valve 33.

The heating pump 31 is electrically connected to the ECU 90. An activation of the heating pump 31 is controlled by the ECU 90.

<Heat Pump>

The heat pump 60 includes the condenser 61, the outside air heat exchanger 62, a compressor 63, an expansion valve 64, and a cooling medium circulation passage.

The cooling medium circulation passage is formed by an internal cooling medium passage (not shown) of the condenser 61, an internal cooling medium passage (not shown) of the outside air heat exchanger 62, and first to third cooling medium passages 71 to 73.

The first cooling medium passage 71 is a passage, through which the cooling medium flows. The first cooling medium passage 71 fluidically connects a cooling medium discharging opening of the compressor 63 to a cooling medium inlet of the condenser 61. The second cooling medium passage 72 is a passage, through which the cooling medium flows. The second cooling medium passage 72 fluidically connects a cooling medium outlet of the condenser 61 to a cooling medium inlet of the outside air heat exchanger 62. The third cooling medium passage 73 is a passage, through which the cooling medium flows. The third cooling medium passage 73 fluidically connects a cooling medium outlet of the outside air heat exchanger 62 to a cooling medium suctioning opening of the compressor 63.

The expansion valve 64 is provided at the second cooling medium passage 72. The expansion valve 64 reduces a pressure of the cooling medium when the cooling medium flow through the expansion valve 64. As a result, the cooling medium becomes likely to evaporate.

The compressor 63 is electrically connected to the ECU 90. An activation of the compressor 63 is controlled by the ECU 90.

<System Start-up Switch>

A system start-up switch 91 is a switch operated by a driver of the vehicle 100. The system start-up switch 91 is electrically connected to the ECU 90. When the system start-up switch 91 is set at an ON position by the driver, the ECU 90 becomes ready to perform at least one of an operation of the engine 110, an activation of the first motor generator 111, and an activation of the second motor generator 112, depending on an output Pdv_req to be supplied to the drive wheels 170 through the wheel drive shaft 160. On the other hand, when the system start-up switch 91 is set at an OFF position by the driver, the ECU 90 stops the operation of the engine 110, the activation of the first motor generator 111, and the activation of the second motor generator 112. Hereinafter, the output Pdv_req to be supplied to the driving wheels 170 will be referred to as "requested driving force Pdv_req", and the operation of the engine 110 will be referred to as "engine operation".

<Interior Space Temperature Setting Switch>

An interior space temperature setting switch 92 is provided at a portion of the vehicle 100 such that the driver of the vehicle 100 can operate the interior space temperature setting switch 92. The interior space temperature setting switch 92 is electrically connected to the ECU 90. When the system start-up switch 91 is set at the ON position, and the interior space temperature setting switch 92 is set at an ON position by the driver, the ECU 90 determines that a process of heating an interior space 101 of the vehicle 100 is requested. On the other hand, when the interior space temperature setting switch 92 is set at an OFF position by the driver although the system start-up switch 91 is set at the ON position, the ECU 90 determines that the process of heating the interior space 101 is not requested. Also, when the system start-up switch 91 is set at the OFF position although the interior space temperature setting switch 92 is set at the ON position, the ECU 90 determines that the process of heating the interior space 101 is not requested.

Further, the driver can set a temperature requested as a temperature of the interior space 101 by operating the interior space temperature setting switch 92 when the driver sets the interior space temperature setting switch 92 at the ON position. The interior space temperature setting switch 92 sends a signal representing the set temperature to the ECU 90. The ECU 90 acquires the temperature requested as the temperature of the interior space 101 as a requested interior space temperature Tin_req on the basis of the signal sent from the interior space temperature setting switch 92.

<Sensors>

An engine water temperature sensor 93 is provided at the second engine water passage 22 between the outlet of the engine internal water passage 25 and a connection portion P3, at which the first connection water passage 51 is fluidically connected to the second engine water passage 22. The engine water temperature sensor 93 is electrically connected to the ECU 90. The engine water temperature sensor 93 detects a temperature of the cooling water flowing out of the engine internal water passage 25 and sends a signal representing the detected temperature to the ECU 90. The ECU 90 acquires the temperature of the cooling water flowing out of the engine internal water passage 25 as an engine water temperature TWeng on the basis of the signal sent from the engine water temperature sensor 93.

A heat pump water temperature sensor 94 is provided at the second heating water passage 42. The heat pump water temperature sensor 94 is electrically connected to the ECU 90. The heat pump water temperature sensor 94 detects the temperature of the cooling water flowing out of the condenser water passage 46 and sends a signal representing the detected temperature to the ECU 90. The ECU 90 acquires the temperature of the cooling water flowing out of the condenser water passage 46 as a heater core inlet water temperature TWhc_in on the basis of the signal sent from the heat pump water temperature sensor 94.

A heater core water temperature sensor 95 is provided at the third heating water passage 43. The heater core water temperature sensor 95 is electrically connected to the ECU 90. The heater core water temperature sensor 95 detects the temperature of the cooling water flowing out of the heater core water passage 45 and sends a signal representing the detected temperature to the ECU 90. The ECU 90 acquires the temperature of the cooling water flowing out of the heater core water passage 45 as a heater core output water temperature TWhc_out on the basis of the signal sent from the heater core water temperature sensor 95.

An interior space temperature sensor 96 is provided at a portion of the vehicle 100 such that the interior space temperature sensor 96 can detect the temperature of the interior space 101 of the vehicle 100. The interior space temperature sensor 96 is electrically connected to the ECU 90. The interior space temperature sensor 96 detects the temperature of the interior space 101 and sends a signal representing the detected temperature to the ECU 90. The ECU 90 acquires the temperature of the interior space 101 as an interior space temperature Tin on the basis of the signal sent from the interior space temperature sensor 96.

An outside air temperature sensor 97 is provided at a portion of the vehicle 100 such that the outside air temperature sensor 97 can detect a temperature of an outside air outside of the vehicle 100. The outside air temperature sensor 97 is electrically connected to the ECU 90. The outside air temperature sensor 97 detects the temperature of the outside air and sends a signal representing the detected temperature to the ECU 90. The ECU 90 acquires the temperature of the outside air as an outside air temperature Ta on the basis of the signal sent from the outside air temperature sensor 97.

An acceleration pedal operation amount sensor 98 is provided at a portion of the vehicle 100 such that the acceleration pedal operation amount sensor 98 can detect an operation amount of an acceleration pedal (not shown) of the vehicle 100. The acceleration pedal operation amount sensor 98 is electrically connected to the ECU 90. The acceleration pedal operation amount sensor 98 detects the operation amount of the acceleration pedal and send a signal representing the detected operation amount to the ECU 90. The ECU 90 acquires the operation amount of the acceleration pedal as an acceleration pedal operation amount AP on the basis of the signal sent from the acceleration pedal operation amount sensor 98 In addition, the ECU 90 acquires an engine load KL on the basis of the acceleration pedal operation amount AP. The engine load KL is a load of the engine 110.

A crank angle sensor 99 is provided adjacent to a crank shaft (not shown) of the engine 110. The crank angle sensor 99 is electrically connected to the ECU 90. The crank angle sensor 99 sends a pulse signal to the ECU 90 each time the crank shaft rotates by a predetermined angle (for example, 10 degrees). The ECU 90 acquires an engine speed NE on the basis of the signal sent from the crank angle sensor 99, etc. The engine speed NE is a rotation speed of the engine 110.

<Engine Operation, Etc.>

The ECU 90 acquires or calculates the output Pdv_req to be supplied to the driving wheels 170 through the wheel drive shaft 160 in a known manner. That is, the ECU 90 acquires or calculates the requested driving force Pdv_req in a known manner. The ECU 90 acquires or calculates the power output from the engine 110 to the power distribution mechanism 140 as a requested engine output power Peng_req, acquires or calculates the power output from the first motor generator 111 to the power distribution mechanism 140 as a requested first motor generator output power Pmg1_req, and acquires or calculates the power output from the second motor generator 112 to the power distribution mechanism 140 as a requested second motor generator output power Pmg2_req on the basis of the requested driving force Pdv_req.

The ECU 90 controls the engine operation to output the power corresponding to the requested engine output power Peng_req from the engine 110 to the power distribution mechanism 140, and controls the activation of the inverter 131 to output the power corresponding to the requested first motor generator output power Pmg1_req and the power corresponding to the requested second motor generator output power Pmg2_req from the first motor generator 111 and the second motor generator 112 to the power distribution mechanism 140, respectively.

Further, the ECU 90 operates the engine 110 to rotate the first motor generator 111 by the power output from the engine 110, thereby generating the electric power and storing the generated electric power in the battery 120 when an amount SOC of the electric power stored in the battery 120 becomes smaller than a predetermined electric power amount SOCth.

<Summary of Operation of Embodiment Apparatus>

Next, a summary of an operation of the embodiment apparatus will be described.

<Engine Cooling Request>

The engine 110 is operated when the requested engine output power Peng_req is larger than zero. While the engine 110 is operated, the engine 110 generates heat. When a temperature Teng of the engine 110 is within a predetermined engine temperature range WTeng higher than zero, a temperature of lubrication oil for lubricating the engine 110 is optimal. As a result, friction resistances of moving parts of the engine 110 are small and thus, the engine 110 is operated in a desired manner. Hereinafter, the temperature Teng of the engine 110 will be referred to as "the engine temperature Teng".

Accordingly, the embodiment apparatus determines that a process of cooling the engine 110 is requested when the requested engine output power Peng_req is larger than zero, the engine 110 is operated, and the engine water temperature TWeng is equal to or higher than an engine warmed water temperature TWeng_dan. On the other hand, when the requested engine output power Peng_req is larger than zero, the engine 110 is operated, and the engine water temperature TWeng is lower than the engine warmed water temperature TWeng_dan, the embodiment apparatus determines that the process of cooling the engine 110 is not requested.

In this embodiment, the embodiment apparatus uses the engine water temperature TWeng as a parameter correlating with the engine temperature Teng. Therefore, the engine warmed water temperature TWeng_dan corresponds to the engine water temperature TWeng when the engine temperature Teng corresponds to a lower limit temperature Teng_lower of the predetermined engine temperature range WTeng. The engine warmed water temperature TWeng_dan is previously set on the basis of a result of an experiment, etc.

The embodiment apparatus determines that the process of cooling the engine 110 is not requested when the engine operation stops.

<Core Heating Request>

As described above, the embodiment apparatus determines that the process of heating the interior space 101 of the vehicle 100 is requested when the system start-up switch 91 is set at the ON position, and the interior space temperature setting switch 92 is set at the ON position. Further, when the process of heating the interior space 101 is requested, and the interior space temperature Tin is lower than the requested interior space temperature Tin_req, a temperature Thc of the heater core 32 is lower than a temperature Thc_req requested for increasing the interior space temperature Tin to the requested interior space temperature Tin_req. Therefore, the embodiment apparatus determines that a process of heating the heater core 32 is requested when the process of heating the interior space 101 is requested, and the interior space temperature Tin is lower than the requested interior space temperature Tin_req. Hereinafter, the temperature Thc of the heater core 32 will be referred to as "the heater core temperature Thc", and the temperature Thc_req requested for increasing the interior space temperature Tin to the requested interior space temperature Tin_req will be referred to as "the requested heater core temperature Thc_req".

<Engine Operated>

<First Circulation Control>

Figure 3:
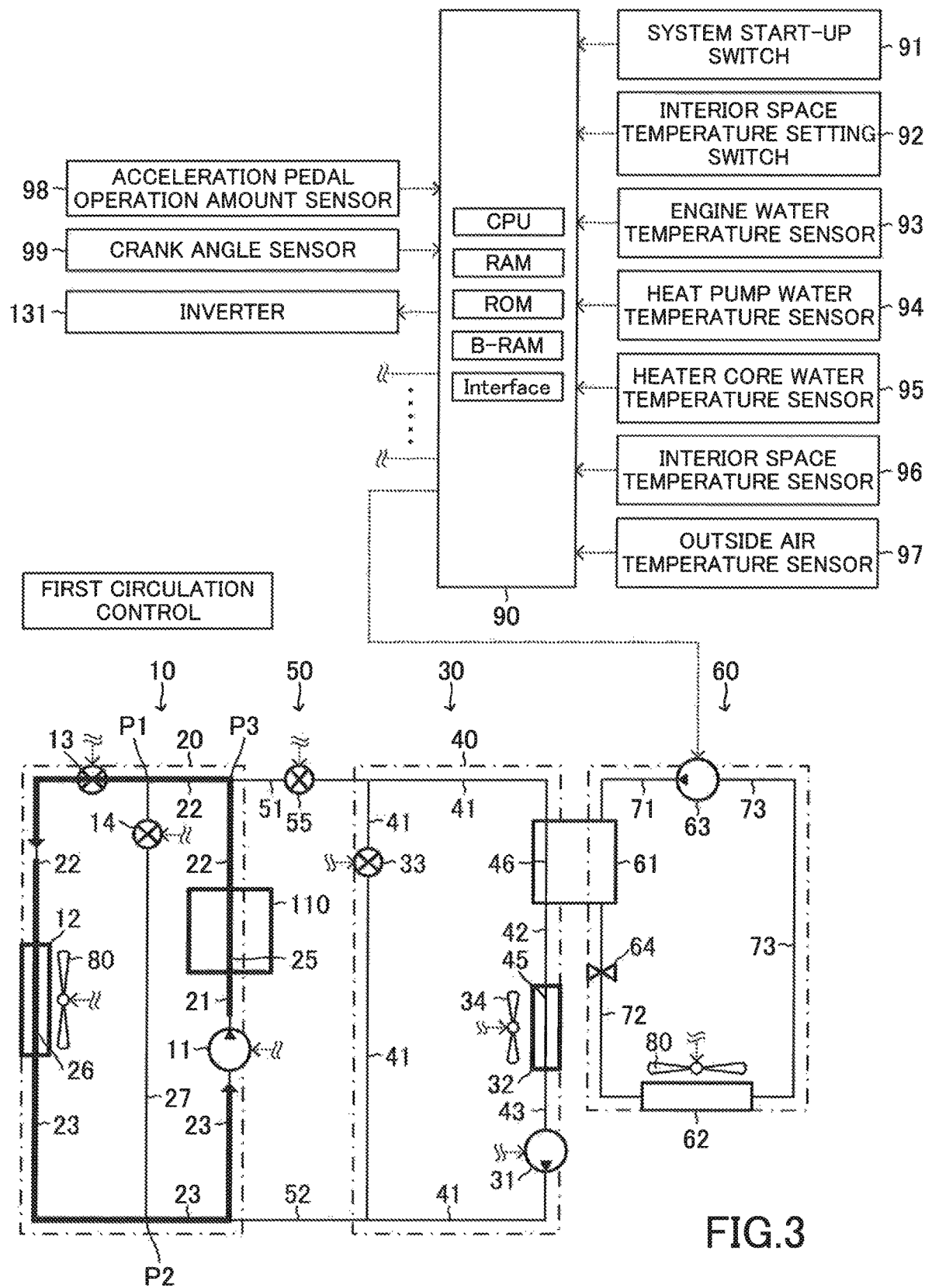
FIG. 3 is similar to FIG. 2 and which is a view for showing a flow of cooling water.

The embodiment apparatus executes a first circulation control for flowing the cooling water as shown by arrows in FIG. 3 when the process of cooling the engine 110 is requested, and the process of heating the heater core 32 is not requested.

When the embodiment apparatus executes the first circulation control, the embodiment apparatus sets the engine water passage shut-off valve 13 at the open position, sets the bypass control valve 14 at the closed position, sets the connection water passage shut-off valve 55 at the closed position, activates the engine pump 11, and activates the heat exchanging fan 80. At this time, the embodiment apparatus keeps stopping the activations of the heating pump 31, the heating fan 34, and the compressor 63, respectively. The embodiment apparatus may set the heating water passage shut-off valve 33 at any of the open and closed positions when the embodiment apparatus executes the first circulation control.

When the first circulation control is executed, the cooling water discharged from the engine pump 11 flows into the engine internal water passage 25 through the first engine water passage 21. The cooling water flows through the engine internal water passage 25 and then, flows into the radiator water passage 26 through the second engine water passage 22. The cooling water flows through the radiator water passage 26 and then, is suctioned into the engine pump 11 through the third engine water passage 23.

Thereby, the cooling water, which is cooled by the radiator 12 while the cooling water flows through the radiator water passage 26, is supplied to the engine internal water passage 25. As a result, the engine 110 can be cooled by the supplied cooling water.

<Second Circulation Control>

On the other hand, when the process of cooling the engine 110 is requested, and the process of heating the heater core 32 is requested, the heater core 32 can be heated by supplying the cooling water, which is heated by the heat pump 60, to the heater core water passage 45. In this regard, the heater core 32 can be heated by supplying the cooling water which cooled the engine 110 (hereinafter, will be referred to as "engine cooling water"), to the heater core water passage 45. Accordingly, the embodiment apparatus supplies the engine cooling water to the heater core water passage 45 to heat the heater core 32 while the heater core 32 can be heated by supplying the engine cooling water to the heater core water passage 45.

Figure 4:
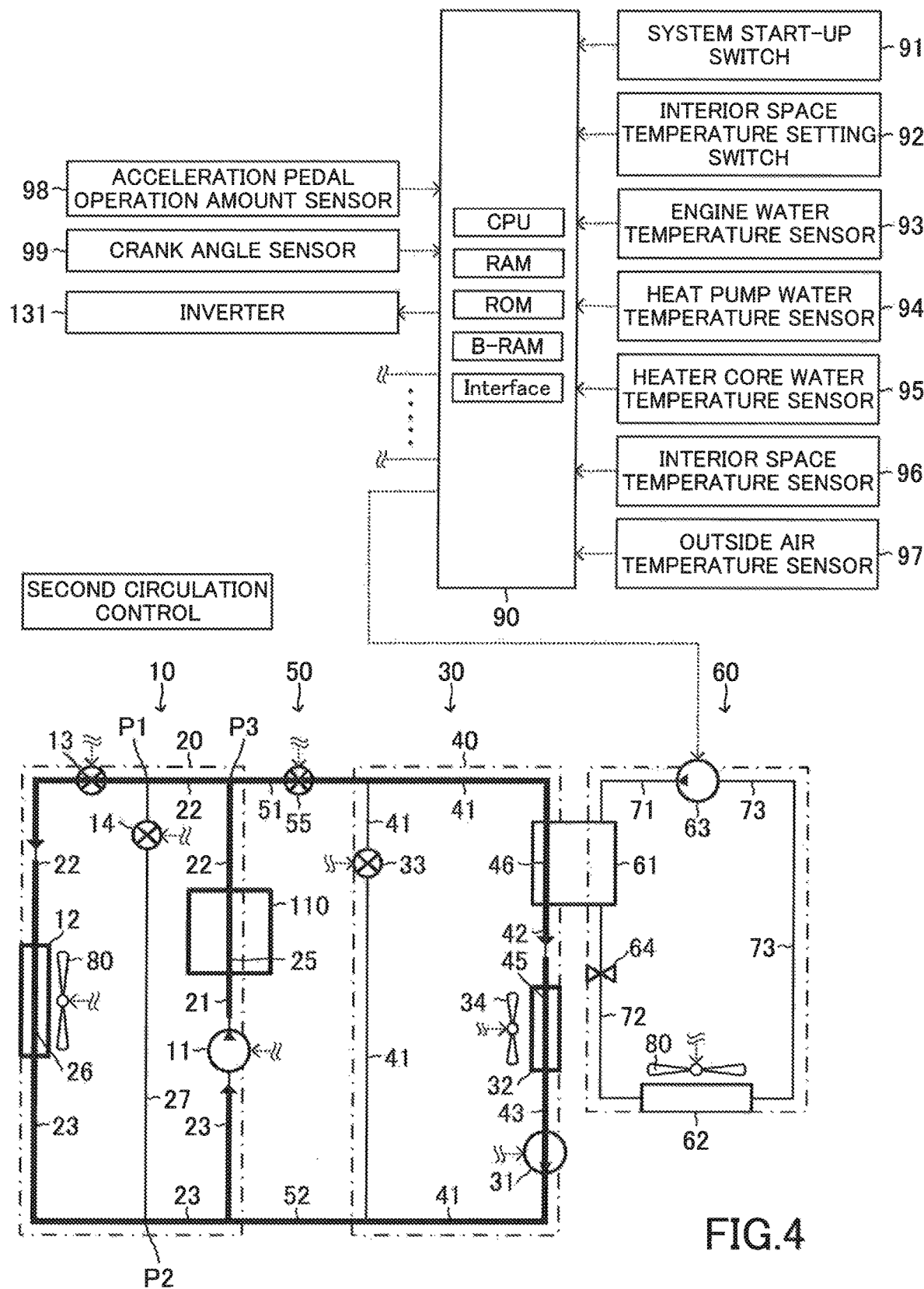
FIG. 4 is similar to FIG. 2 and which is a view for showing the flow of the cooling water.

In particular, when the process of cooling the engine 110 is requested, the process of heating the heater core 32 is requested, and a heat pump activation condition described later is not satisfied, the embodiment apparatus executes a second circulation control for flowing the cooling water as shown by arrows in FIG. 4 and executing the first circulation control.

When the embodiment apparatus executes the second circulation control, the embodiment apparatus executes the first circulation control, sets the connection water passage shut-off valve 55 at the open position, sets the heating water passage shut-off valve 33 at the closed position, and activates the heating fan 34. At this time, the embodiment apparatus keeps stopping the activation of the compressor 63. When the embodiment apparatus executes the second circulation control, the embodiment apparatus may activate the heating pump 31 without activating the engine pump 11 or activate both of the engine pump 11 and the heating pump 31.

The heat pump activation condition is not satisfied while the temperature of the heater core 32 can be increased by supplying the engine cooling water to the heater core water passage 45. On the other hand, the heat pump activation condition is satisfied when the temperature of the heater core 32 cannot be increased even by supplying the engine cooling water to the heater core water passage 45. In this embodiment, the embodiment apparatus determines that the heat pump activation condition is satisfied when a first condition C1 and a second condition C2 described below are satisfied.

The first condition C1 is satisfied when the engine cooling water is supplied to the condenser water passage 46. The embodiment apparatus determines whether the first condition C1 is satisfied on the basis of the setting positions of the engine water passage shut-off valve 13, the bypass control valve 14, the connection water passage shut-off valve 55, and the heating water passage shut-off valve 33 and activation states of the engine pump 11 and the heating pump 31.

The second condition C2 is satisfied when an increasing rate Rhc of the temperature of the heater core 32 is smaller than a predetermined temperature increasing rate Rhc_th. In particular, when the increasing rate Rhc of the temperature of the heater core 32 is smaller than the predetermined temperature increasing rate Rhc_th even by executing the second circulation control, the temperature of the heater core 32 cannot be increased sufficiently only by supplying the engine cooling water to the heater core water passage 45. The embodiment apparatus determines that the increasing rate Rhc of the temperature of the heater core 32 is smaller than the predetermined temperature increasing rate Rhc_th when an increasing rate Rhc_out of the heater core outlet water temperature TWhc_out is smaller than a predetermined water temperature increasing rate Rhc_out_th. Then, the embodiment apparatus determines that the second condition C2 is satisfied when the embodiment apparatus determines that the increasing rate Rhc of the temperature of the heater core 32 is smaller than the predetermined temperature increasing rate Rhc_th. The predetermined water temperature increasing rate Rhc_out_th corresponds to an increasing rate of the heater core outlet water temperature TWhc_out when the increasing rate Rhc of the temperature of the heater core 32 corresponds to the predetermined temperature increasing rate Rhc_th. The predetermined water temperature increasing rate Rhc_out_th is previously set on the basis of results of an experiment, etc.

The increasing rate Rhc of the temperature of the heater core 32 is likely to be equal to or larger than the predetermined temperature increasing rate Rhc_th when a constant time elapses after the engine cooling water (that is, the cooling water flowing out of the engine internal water passage 25) starts to be supplied to the condenser water passage 46. However, the temperature increasing rate Rhc of the temperature of the heater core 32 may be smaller than the predetermined temperature increasing rate Rhc_th soon after the engine cooling water starts to be supplied to the condenser water passage 46.

Accordingly, the embodiment apparatus may be configured to determine whether the second condition C2 is satisfied when the temperature increasing rate Rhc of the temperature of the heater core 32 is smaller than the predetermined temperature increasing rate Rhc_th when a predetermined time elapses after the engine cooling water starts to be supplied to the condenser water passage 46. In this case, the predetermined time is set as a time sufficient for the temperature increasing rate Rhc of the temperature of the heater core 32 to be equal to or larger than the predetermined temperature increasing rate Rhc_th after the engine cooling water starts to be supplied to the condenser water passage 46.

When the second circulation control is executed, the cooling water discharged from the engine pump 11 flows into the engine internal water passage 25 through the first engine water passage 21. The cooling water flows through the engine internal water passage 25 and then, flows into the second engine water passage 22. A part of the cooling water flowing into the second engine water passage 22 flows into the radiator water passage 26 through the second engine water passage 22. The cooling water flows through the radiator water passage 26 and then, is suctioned into the engine pump 11 through the third engine water passage 23. On the other hand, the remaining of the cooling water flowing into the second engine water passage 22, flows into the condenser water passage 46 through the first connection water passage 51 and the first heating water passage 41. The cooling water flows through the condenser water passage 46 and then, flows into the heater core water passage 45 through the second heating water passage 42. The cooling water flows through the heater core water passage 45 and then, is suctioned into the engine pump 11 through the third heating water passage 43, the internal water passage of the heating pump 31, the first heating water passage 41, the second connection water passage 52, and the third engine water passage 23. At this time, the compressor 63 of the heat pump 60 is not activated.

Thereby, a part of the engine cooling water (that is, the cooling water flowing into the second engine water passage 22 from the engine internal water passage 25) is supplied to the heater core water passage 45 without being cooled by the radiator 12. Thus, the heater core 32 can be heated by the supplied cooling water.

<Third Circulation Control>

Figure 5:
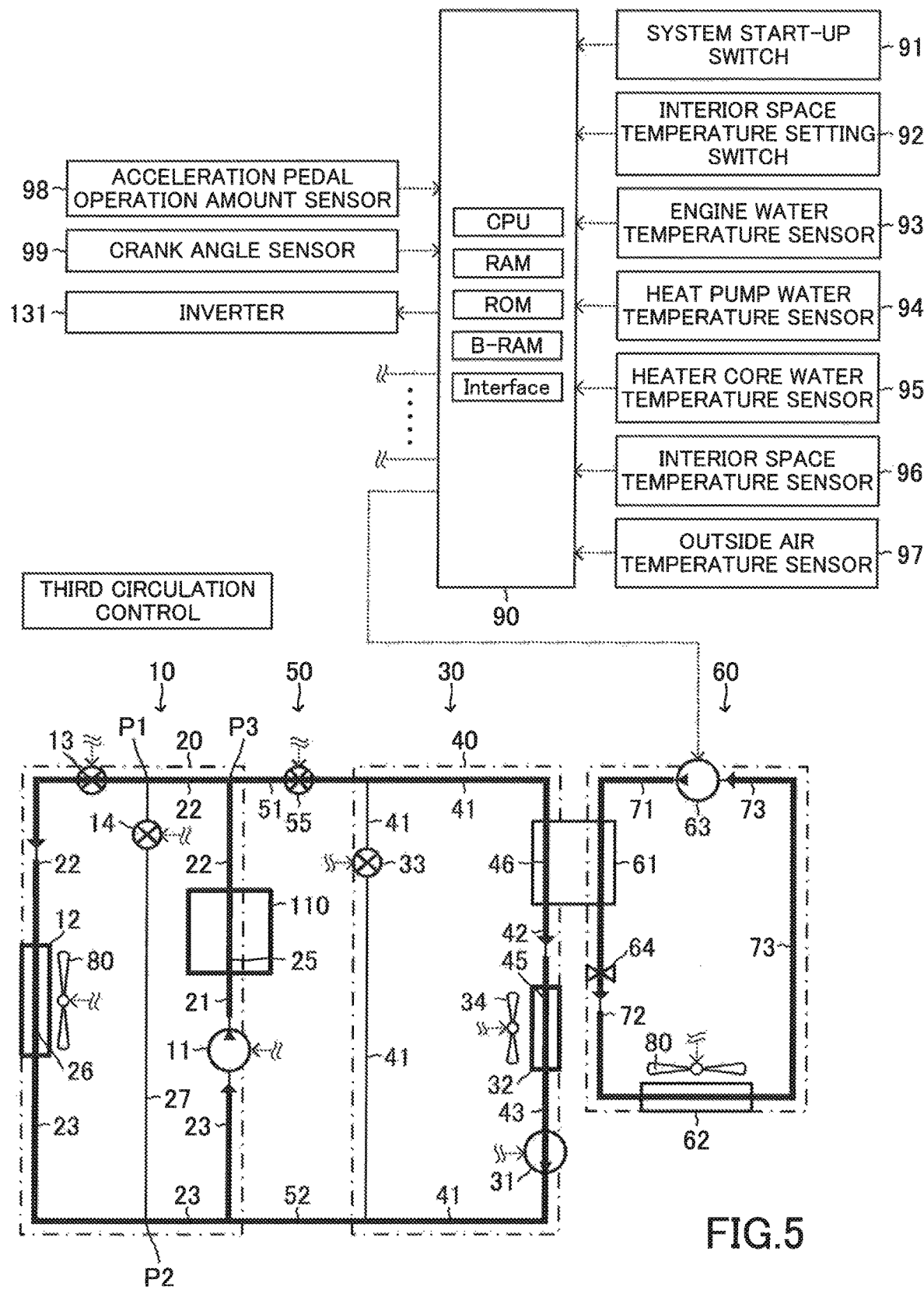
FIG. 5 is similar to FIG. 2 and which is a view for showing the flow of the cooling water and a flow of cooling medium.

When the heat pump activation condition is satisfied while the embodiment apparatus executes the second circulation control, the embodiment apparatus executes a third circulation control for executing the second circulation control and flowing the cooling water and the cooling medium as shown by arrows in FIG. 5.

When the embodiment apparatus executes the third circulation control, the embodiment apparatus executes the second circulation control and activates the compressor 63. Similar to the second circulation control, the embodiment apparatus may activate the heating pump 31 without activating the engine pump 11 or activate both of the engine pump 11 and the heating pump 31 when the embodiment apparatus executes the third circulation control.

When the embodiment apparatus activates the compressor 63, the embodiment apparatus acquires a target value Dcp_tgt of a duty ratio Dcp for controlling the activation of the compressor 63 on the basis of the requested interior space temperature Tin_req, a difference ΔTin (=Tin_req−Tin) of the present interior space temperature Tin relative to the requested interior space temperature Tin_req, and the outside air temperature Ta. Hereinafter, the duty ratio Dcp for controlling the activation of the compressor 63 will be referred to as "the compressor duty ratio Dcp".

In particular, the embodiment apparatus applies the requested interior space temperature Tin_req and the outside air temperature Ta to a look-up table MapDcp_base(Tin_req, Ta) to acquire a base value Dcp_base of the compressor duty ratio Dcp. In this embodiment, the compressor duty ratios Dcp capable of controlling the interior space temperature Tin to the requested interior space temperature Tin_req, depending on the outside air temperature Ta, are acquired on the basis of results of an experiment, etc. The look-up table MapDcp_base(Tin_req,Ta) is prepared to acquire the compressor duty ratio Dcp capable of controlling the interior space temperature Tin to the requested interior space temperature Tin_req on the basis of the requested interior space temperature Tin_req and the outside air temperature Ta. Hereinafter, the base value Dcp_base of the compressor duty ratio Dcp will be referred to as "the base compressor duty ratio Dep_base".

The base compressor duty ratio Dcp_base acquired from the look-up table MapDcp_base(Tin_req,Ta) increases as the requested interior space temperature Tin_req increases. The base compressor duty ratio Dcp_base acquired from the look-up table MapDcp_base(Tin_req,Ta) increases as the outside air temperature Ta decreases.

Further, the embodiment apparatus acquires a feedback control value ΔDcp for controlling a difference ΔTin of the actual interior space temperature Tin relative to the requested interior space temperature Tin_req to zero promptly on the basis of the interior space temperature difference ΔTin by using a known method. The embodiment apparatus adds the feedback control value ΔDcp to the base compressor duty ratio Dcp_base to acquire a target value Dcp_tgt (=Dcp_base+ΔDcp) of the compressor duty ratio Dcp. Hereinafter, the difference ΔTin of the actual interior space temperature Tin relative to the requested interior space temperature Tin_req, will be referred to as "the interior space temperature difference ΔTin", and the target value Dcp_tgt of the compressor duty ratio Dcp will be referred to as "the target compressor duty ratio Dcp_tgt".

The embodiment apparatus activates the compressor 63 by controlling the compressor duty ratio Dcp to the target compressor duty ratio Dcp_tgt.

When the third circulation control is executed, the cooling medium discharged from the compressor 63 flows into the condenser 61 through the first cooling medium passage 71. The cooling medium flows through the condenser 61 and then, flows into the outside air heat exchanger 62 through the second cooling medium passage 72. The cooling medium flows through the outside air heat exchanger 62 and then, is suctioned into the compressor 63 through the third cooling medium passage 73.

Thereby, the cooling water having the temperature increased by cooling the engine 110 is supplied to the condenser water passage 46. The cooling water is heated by the cooling medium compressed by the compressor 63 and having the increased temperature while the cooling water flows through the condenser water passage 46. Therefore, the temperature of the cooling water is further increased. The cooling water having the further increased temperature is supplied to the heater core water passage 45. Thus, even when the temperature of the heater core 32 cannot be increased to the temperature sufficient for increasing the interior space temperature Tin to the requested interior space temperature Tin_req only by supplying the cooling water which cooled the engine 110, to the heater core water passage 45, the temperature of the heater core 32 can be increased to the temperature sufficient for increasing the interior space temperature Tin to the requested interior space temperature Tin_req.

<Engine Operation Stopped>
<Forth Circulation Control>

When the requested engine output power Peng_req is zero, the engine operation is stopped. When the process of heating the heater core 32 is requested at this time, the embodiment apparatus heats the heater core 32 by supplying the cooling water heated by the heat pump 60 to the heater core water passage 45.

Figure 6:
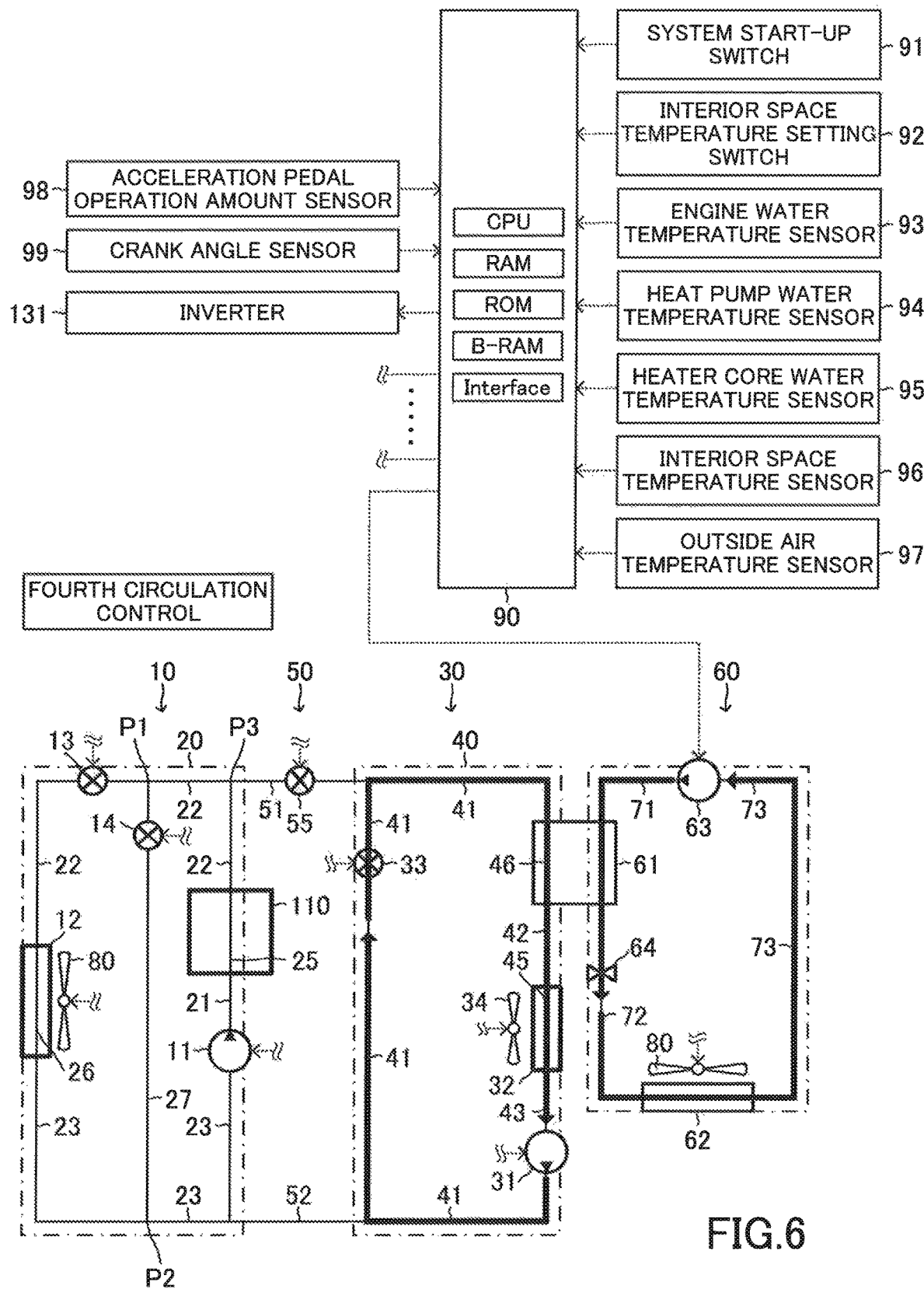
FIG. 6 is similar to FIG. 2 and which is a view for showing the flow of the cooling water and the flow of the cooling medium.

In particular, when the engine operation is stopped, and the process of heating the heater core 32 is requested, the embodiment apparatus executes a fourth circulation control for flowing the cooling water and the cooling medium as shown by arrows in FIG. 6.

When the embodiment apparatus executes the fourth circulation control, the embodiment apparatus sets the connection water passage shut-off valve 55 at the closed position, sets the heating water passage shut-off valve 33 at the open position, and activates the heating pump 31, the heating fan 34, the compressor 63, and the heat exchanging fan 80. At this time, the embodiment apparatus keeps stopping the activation of the engine pump 11. When the embodiment apparatus executes the fourth circulation control, the embodiment apparatus may set the engine water passage shut-off valve 13 and the bypass control valve 14 at the open or closed positions, respectively.

When the fourth circulation control is executed, the cooling water discharged from the heating pump 31 flows into the condenser water passage 46 through the first heating water passage 41. The cooling water flows through the condenser water passage 46 and then, flows into the heater core water passage 45 through the second heating water passage 42. The cooling water flows through the heater core water passage 45 and then, is suctioned into the heating pump 31 through the third heating water passage 43. A flow of the cooling medium by executing the fourth circulation control is the same as the flow of the cooling medium by executing the third circulation control (see FIG. 5).

Thereby, the cooling water is heated by the cooling medium flowing through the condenser 61 of the heat pump 60 while the cooling water flows through the condenser water passage 46. The heated cooling water is supplied to the heater core water passage 45. Thus, the heater core 32 can be heated by the supplied cooling water.

<Fifth Circulation Control>

Figure 7:
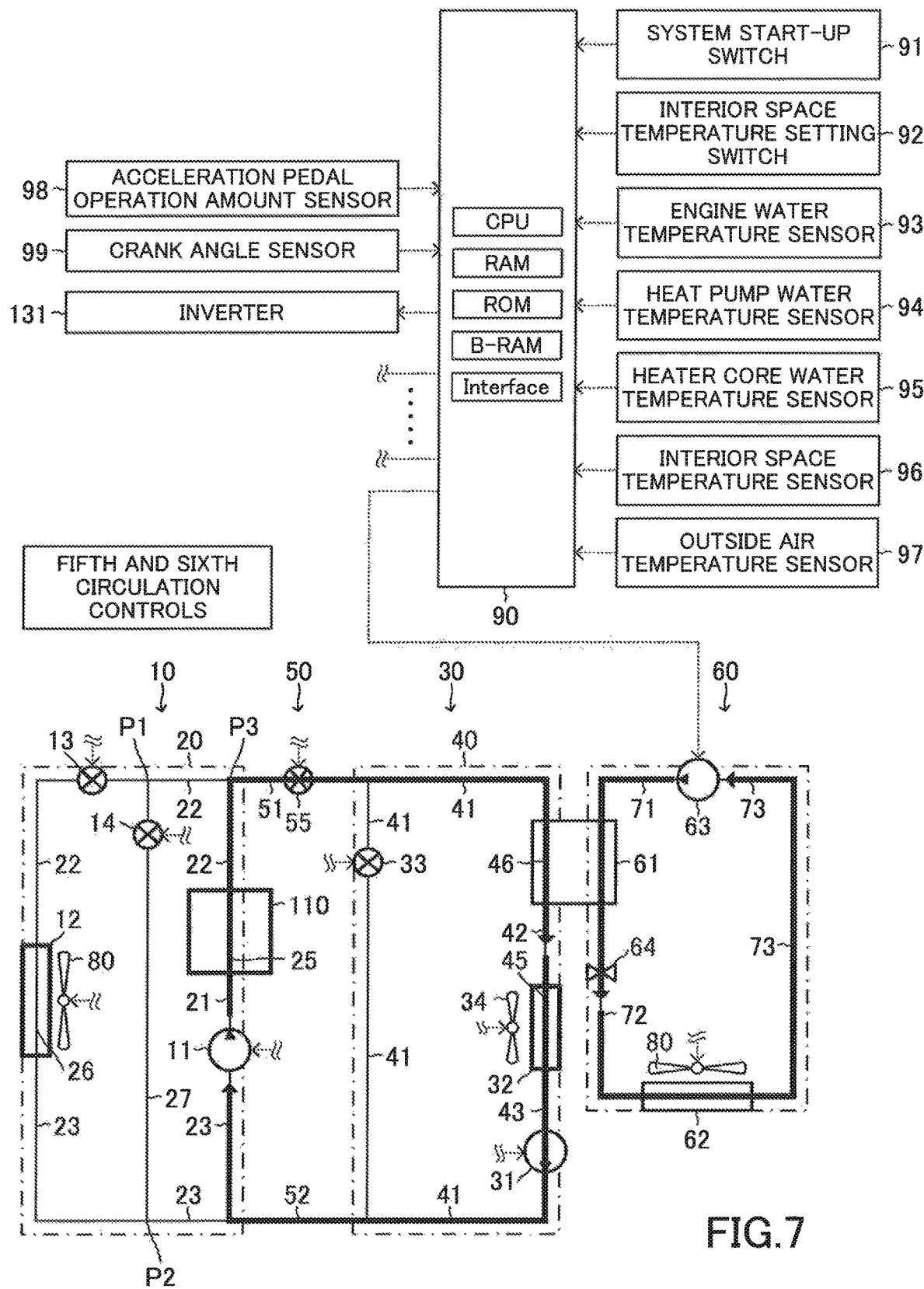
FIG. 7 is similar to FIG. 2 and which is a view for showing the flow of the cooling water and the flow of the cooling medium.

When the compressor duty ratio Dcp reaches a maximum value Dcp_max while the embodiment apparatus executes the fourth circulation control, the embodiment apparatus executes a fifth circulation control for operating the engine 110 and flowing the cooling water and the cooling medium as shown by arrows in FIG. 7.

When the embodiment apparatus executes the fifth circulation control, the embodiment apparatus operates the engine 110 as described above, sets the engine water passage shut-off valve 13 at the closed position, sets the bypass control valve 14 at the closed position, sets the connection water passage shut-off valve 55 at the open position, sets the heating water passage shut-off valve 33 at the closed position, stops the activation of the heating pump 31, and activates the engine pump 11. At this time, the embodiment apparatus keeps activating the compressor 63 and the heat exchanging fan 80. When the embodiment apparatus executes the fifth circulation control, the embodiment apparatus may continue to activate the heating pump 31 without activating the engine pump 11 or activates the engine pump 11 with continuing to activate the heating pump 31.

When the fifth circulation control is executed, the cooling water discharged from the engine pump 11 flows into the engine internal water passage 25 through the first engine water passage 21. The cooling water flows through the engine internal water passage 25 and then, flows into the condenser water passage 46 through the second engine water passage 22, the first connection water passage 51, and the first heating water passage 41. The cooling water flows through the condenser water passage 46 and then, flows into the heater core water passage 45 through the second heating water passage 42. The cooling water flows through the heater core water passage 45 and then, is suctioned into the engine pump 11 through the third heating water passage 43, the internal water passage of the heating pump 31, the first heating water passage 41, the second connection water passage 52, and the third engine water passage 23.

Thereby, the cooling water having the temperature increased by cooling the engine 110, is supplied to the condenser water passage 46. The cooling water having the increased temperature is heated by the cooling medium having the temperature increased by a compression by the compressor 63 while the cooling water flows through the condenser water passage 46. Therefore, the temperature of the cooling water is further increased. The cooling water having the further increased temperature is supplied to the heater core water passage 45. Thus, even when the temperature of the heater core 32 cannot be increased to the temperature sufficient for increasing the interior space temperature Tin to the requested interior space temperature Tin_req only by supplying the cooling water heated by the heat pump 60 to the heater core water passage 45, the temperature of the heater core 32 can be increased to the temperature sufficient for increasing the interior space temperature Tin to the requested interior space temperature Tin_req by the supplied cooling water.

<Sixth Circulation Control>

When the engine water temperature TWeng reaches the engine warmed water temperature TWeng_dan while the embodiment apparatus executes the fifth circulation control, the embodiment apparatus executes a sixth circulation control for stopping the engine operation. At this time, the embodiment apparatus continues to set the engine water passage shut-off valve 13 at the closed position, set the bypass control valve 14 at the closed position, set the connection water passage shut-off valve 55 at the open position, and set the heating water passage shut-off valve 33 at the closed position. In addition, the embodiment apparatus continues to activate the engine pump 11, the heating fan 34, the compressor 63, and the heat exchanging fan 80.

The flows of the cooling water and the cooling medium by executing the sixth circulation control are the same as the flows of the cooling water and the cooling medium by executing the fifth circulation control (see FIG. 7).

After the engine water temperature TWeng reaches the engine warmed water temperature TWeng_dan, the temperature of the engine 110 is high sufficiently. In addition, the embodiment apparatus can flow the cooling water through the engine internal water passage 25 by continuing to activate the engine pump 11. In this case, the cooling water can be heated while the cooling water flows through the engine internal water passage 25 even when the embodiment apparatus stops the engine operation. In addition, the embodiment apparatus can maintain the temperature of the cooling water supplied to the heater core water passage 45 at a high temperature by supplying the cooling water to the condenser water passage 46. Further, the amount of the fuel consumed can be reduced by stopping the engine operation.

When the engine water temperature TWeng reaches the engine warmed water temperature TWeng_dan while the sixth circulation control is executed, the embodiment apparatus stops the engine operation. At this time, the embodiment apparatus continues to activate the engine pump 11. Thus, the cooling water, which flowed through the engine internal water passage 25 to have the temperature increased, is supplied to the condenser water passage 46. Therefore, the temperature of the cooling water supplied to the heater core water passage 45 is maintained at the high temperature. Thus, the heater core 32 can be heated, and the amount of the fuel consumed can be decreased.

<Seventh Circulation Control>

When the interior space temperature difference ΔTin becomes equal to or smaller than the predetermined interior space temperature difference ΔTin_th while the embodiment apparatus executes the fifth or sixth circulation control, the embodiment apparatus executes a seventh circulation control for stopping the activation of the compressor 63 and the heat exchanging fan 80. At this time, the embodiment apparatus continues to set the engine water passage shut-off valve 13 at the closed position, set the bypass control valve 14 at the closed position, set the connection water passage shut-off valve 55 at the open position, and set the heating water passage shut-off valve 33 at the closed position. Further, the embodiment apparatus continues to activate the engine pump 11 and the heating fan 34.

Figure 8:
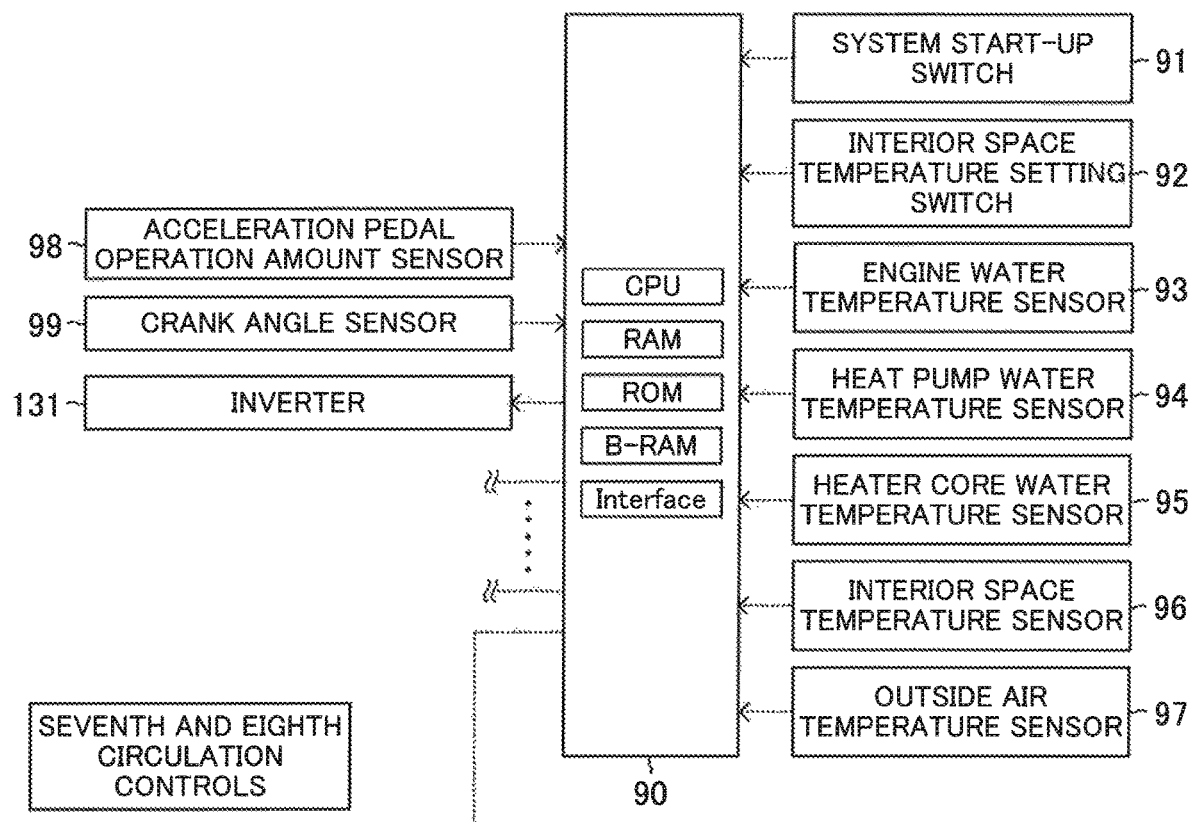
FIG. 8 is similar to FIG. 2 and which is a view for showing the flow of the cooling water.
Figure 8:
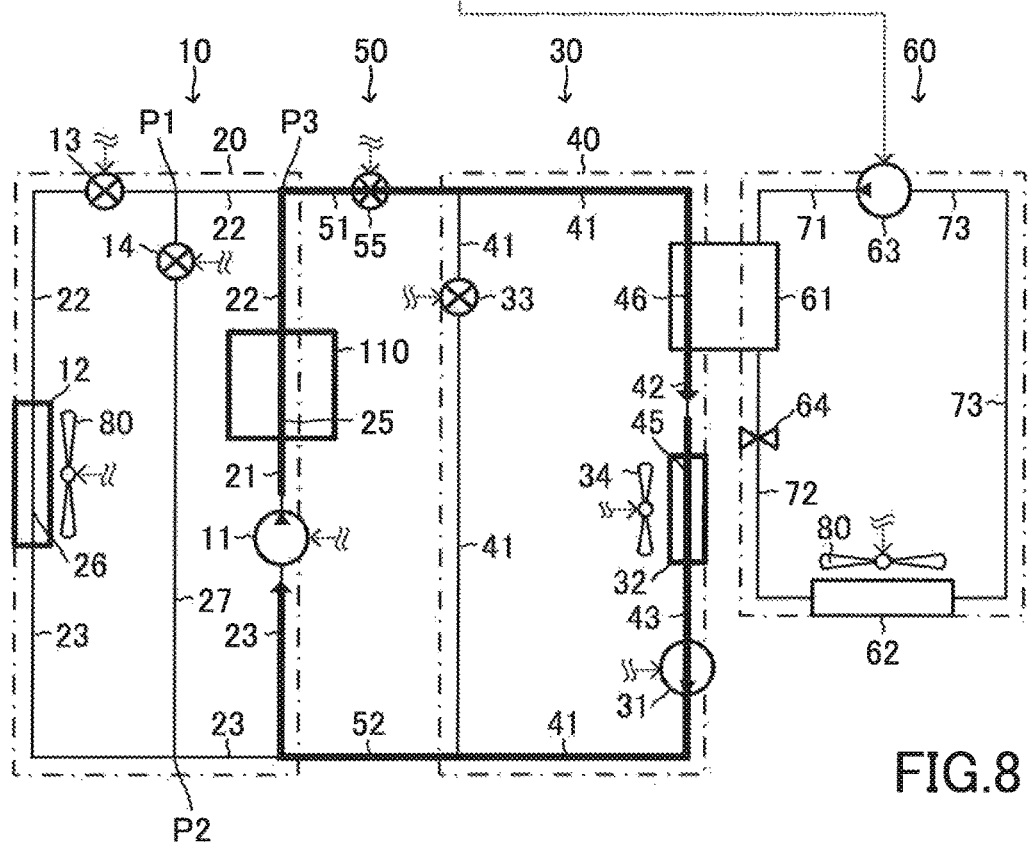

When the seventh circulation control is executed, the cooling water discharged from the engine pump 11 flows as shown in FIG. 8. The flow of the cooling water by executing the seventh circulation control is the same as the flow of the cooling water by executing the fifth or sixth circulation control (see FIG. 7).

When the fifth circulation control is executed, the engine temperature Teng increases gradually although the engine temperature Teng does not reach the engine warmed temperature Teng_dan. Therefore, an amount of the heat provided from the engine pump 11 to the cooling water flowing through the engine internal water passage 25, increases gradually. On the other hand, when the sixth circulation control is executed, the engine temperature Teng reaches the engine warmed temperature Teng_dan. Thus, the engine 110 has heat sufficient for supplying the sufficient amount of the heat to the cooling water flowing through the engine internal water passage 25.

Therefore, when the interior space temperature difference ΔTin becomes small while the fifth or sixth circulation control is executed, the embodiment apparatus can heat the cooling water flowing through the engine internal water passage 25 by continuing to activate the engine pump 11 even when the embodiment apparatus stops the activation of the compressor 63. In addition, the temperature of the heater core 32 may be increased to the temperature capable of increasing the interior space temperature Tin to the requested interior space temperature Tin_req by supplying the cooling water to the heater core water passage 45. Further, an amount of the electric power consumed by activating the compressor 63 may be small by stopping the activation of the compressor 63.

When the interior space temperature difference ΔTin becomes equal to or smaller than the predetermined interior space temperature difference ΔTin_req while the embodiment apparatus executes the seventh circulation control, the embodiment apparatus stops activating the compressor 63. In this case, the embodiment apparatus continues to activate the engine pump 11. Thus, the cooling water which flowed through the engine internal water passage 25 to have the increased temperature, is supplied to the heater core water passage 45. Thus, the heater core 32 can be heated by the supplied cooling water, and the amount of the electric power consumed by activating the compressor 63 can be small.

<Eighth Circulation Control>

When the outside air temperature is considerably low, in particular, the outside air temperature is lower than zero degrees C., the temperature of the cooling water flowing through the condenser water passage 46, may not be increased by the cooling medium flowing through the condenser 61, or an amount of the temperature of the cooling water increased by the cooling medium may be small.

Accordingly, when the process of heating the heater core 32 is requested, and the outside air temperature Ta is lower than a predetermined outside air temperature Ta_th while the embodiment apparatus stops the engine operation, the embodiment apparatus executes an eighth circulation control for operating the engine 110 and flowing the cooling water as shown by the arrows in FIG. 8 without executing the fourth circulation control.

In this embodiment, the predetermined outside air temperature Ta_th is set to a lower limit of the outside air temperature Ta capable of increasing the temperature of the cooling water by the condenser 61. In other words, the predetermined outside air temperature Ta_th is set to an activation limit temperature Ta_low of the heat pump 60. However, the predetermined outside air temperature Ta_th may be set to a temperature slightly higher than the activation limit temperature Ta_low.

When the embodiment apparatus executes the eighth circulation control, the embodiment apparatus operates the engine 110 as described above, sets the engine water passage shut-off valve 13 at the closed position, sets the bypass control valve 14 at the closed position, sets the connection water passage shut-off valve 55 at the open position, sets the heating water passage shut-off valve 33 at the closed position, and activates the engine pump 11 and the heating fan 34. At this time, the embodiment apparatus continues to stop the activations of the heating pump 31, the heat exchanging fan 80, and the compressor 63. In this regard, the embodiment apparatus may activate the heating pump 31 without activating the engine pump 11 or activate both of the engine pump 11 and the heating pump 31.

Thereby, the engine cooling water (that is, the cooling water which cooled the engine 110) is supplied to the heater core water passage 45. Thus, the heater core 32 can be heated even when the outside air temperature is considerably low.

<Ninth Circulation Control>

When the requested engine output power Peng_req becomes larger than zero and as a result, the engine operation is started, the engine temperature Teng is lower than the engine warmed temperature Teng_dan and thus, the engine water temperature TWeng is lower than the engine warmed water temperature TWeng_dan for a constant time after the engine operation is started. In this case, the process of cooling the engine 110 is not requested, and a process of increasing the temperature of the engine 110 is requested, that is, a process of warming the engine 110 is requested.

Figure 9:
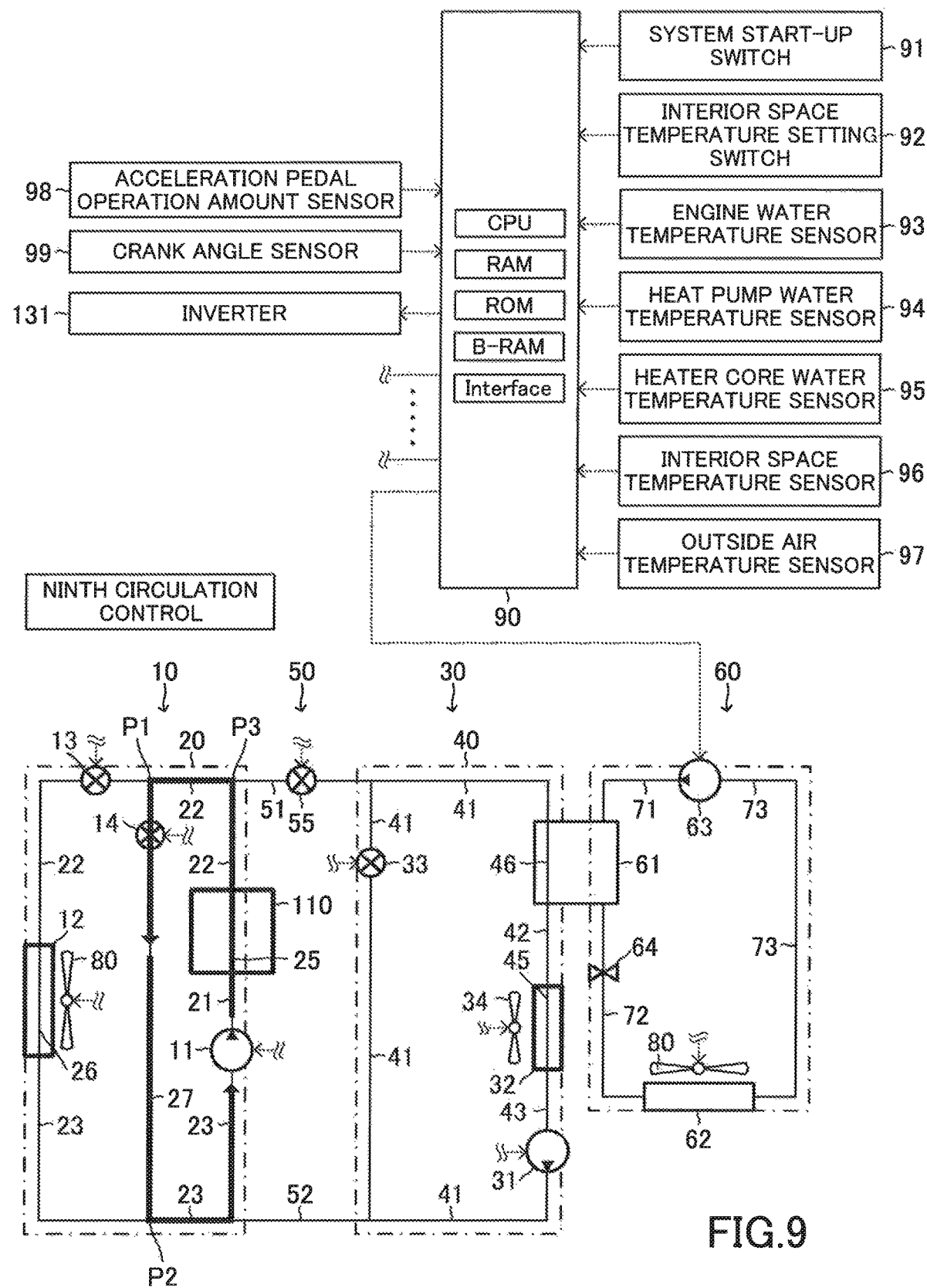
FIG. 9 is similar to FIG. 2 and which is a view for showing the flow of the cooling water.

Accordingly, when the process of warming the engine 110 is requested, and the process of heating the heater core 32 is not requested, the embodiment apparatus executes a ninth circulation control for flowing the cooling water as shown by arrows in FIG. 9.

When the embodiment apparatus executes the ninth circulation control, the embodiment apparatus sets the engine water passage shut-off valve 13 at the closed position, sets the bypass control valve 14 at the open position, sets the connection water passage shut-off valve 55 at the closed position, and activates the engine pump 11. At this time, the embodiment apparatus may set the heating water passage shut-off valve 33 at any of the open and closed positions. In addition, since the process of cooling the engine 110 is not requested, and the process of heating the heater core 32 is not requested, the embodiment apparatus continues to stop the activation of the heat exchanging fan 80, the heating pump 31, the heating fan 34, and the compressor 63.

When the ninth circulation control is executed, the cooling water discharged from the engine pump 11 flows into the engine internal water passage 25 through the first engine water passage 21. The cooling water flows through the engine internal water passage 25 and then, is suctioned into the engine pump 11 through the second engine water passage 22, the bypass water passage 27, and the third engine water passage 23.

Thereby, the cooling water is supplied to the engine internal water passage 25 without being cooled by the radiator 12. Thus, the temperature of the engine 110 can be increased at a large increasing rate.

<Tenth Circulation Control>

Figure 10:
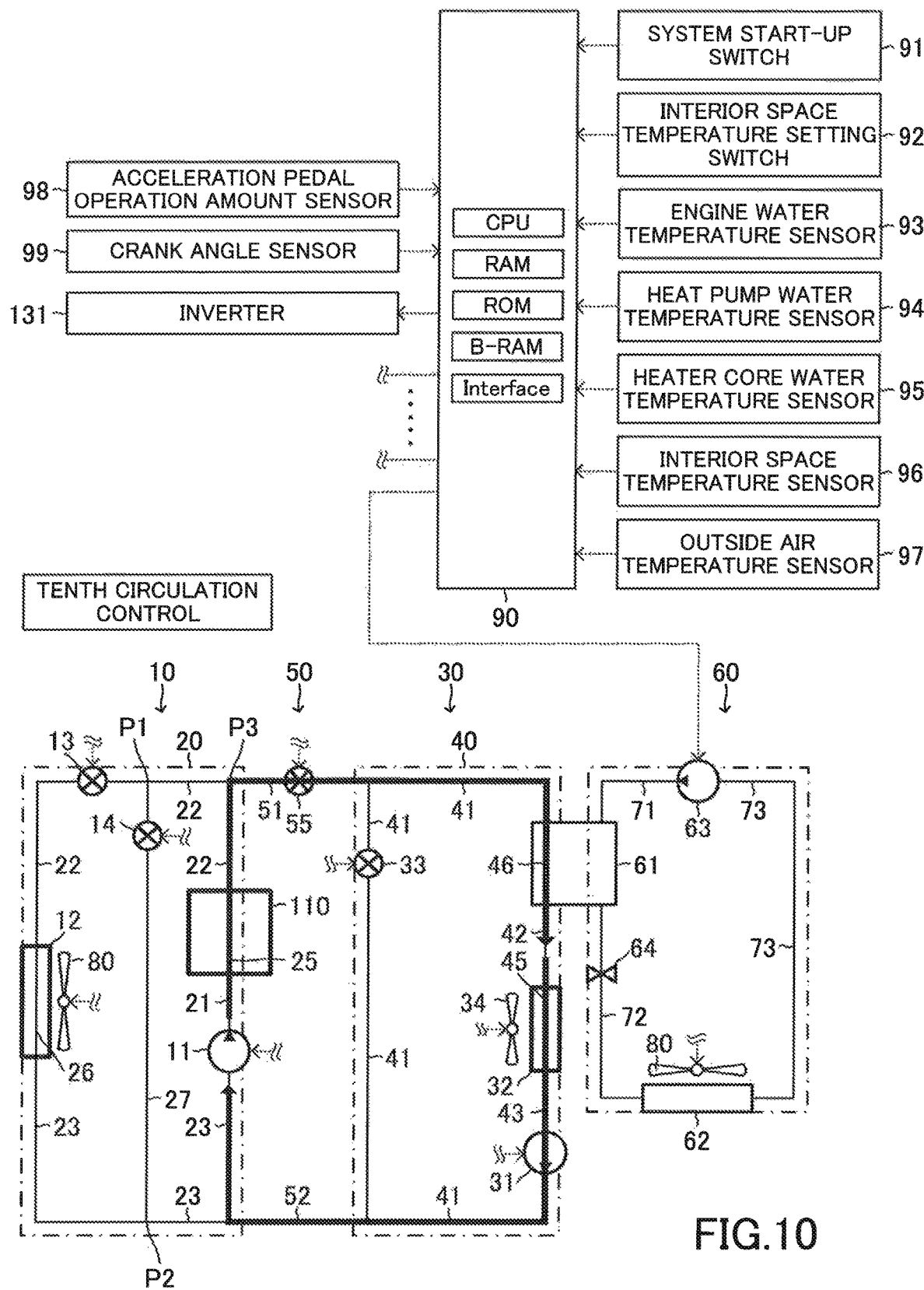
FIG. 10 is similar to FIG. 2 and which is a view for showing the flow of the cooling water.

When the process of heating the heater core 32 is requested while the embodiment apparatus executes the ninth circulation control, the embodiment apparatus executes a tenth circulation control for continuing to activate the engine pump 11 and flowing the cooling water as shown by arrows in FIG. 10 until the heat pump activation condition is satisfied.

When the embodiment apparatus executes the tenth circulation control, the embodiment apparatus continues to activate the engine pump 11 as described above, sets the engine water passage shut-off valve 13 at the closed position, sets the bypass control valve 14 at the closed position, sets the connection water passage shut-off valve 55 at the open position, sets the heating water passage shut-off valve 33 at the closed position, and activates the heating fan 34. At this time, the embodiment apparatus continues to stop the activation of the heat exchanging fan 80, the heating pump 31, and the compressor 63. When the embodiment apparatus executes the tenth circulation control, the embodiment apparatus may activate the heating pump 31 without activating the engine pump 11 or activate both of the engine pump 11 and the heating pump 31.

When the tenth circulation control is executed, the cooling water discharged from the engine pump 11 flows into the engine internal water passage 25 through the first engine water passage 21. The cooling water flows through the engine internal water passage 25 and then, flows into the condenser water passage 46 through the second engine water passage 22, the first connection water passage 51, and the first heating water passage 41. The cooling water flows through the condenser water passage 46 and then, flows into the heater core water passage 45 through the second heating water passage 42. The cooling water flows through the heater core water passage 45 and then, is suctioned into the engine pump 11 through the third heating water passage 43, the internal water passage of the heating pump 31, the first heating water passage 41, the second connection water passage 52, and the third engine water passage 23.

Thereby, the cooling water is supplied to the engine internal water passage 25 without being cooled by the radiator 12. Thus, the temperature of the engine 110 can be increased at the large increasing rate. In addition, the cooling water which cooled the engine 110 to have the increased temperature, is supplied to the heater core water passage 45. Thus, the heater core 32 can be heated by the supplied cooling water.

<Eleventh Circulation Control>

When the heat pump activation condition is satisfied while the embodiment apparatus executes the tenth circulation control, the embodiment apparatus executes an eleventh circulation control for continuing to execute the tenth circulation control and activating the compressor 63 and the heat exchanging fan 80.

At this time, the embodiment apparatus continues to set the engine water passage shut-off valve 13 at the closed position, set the bypass control valve 14 at the closed position, and set the heating fan 34 at the closed position, and set the connection water passage shut-off valve 55 at the open position. In addition, the embodiment apparatus continues to activate the engine pump 11 and the heating fan 34 and stop the activation of the heating pump 31.

Figure 11:
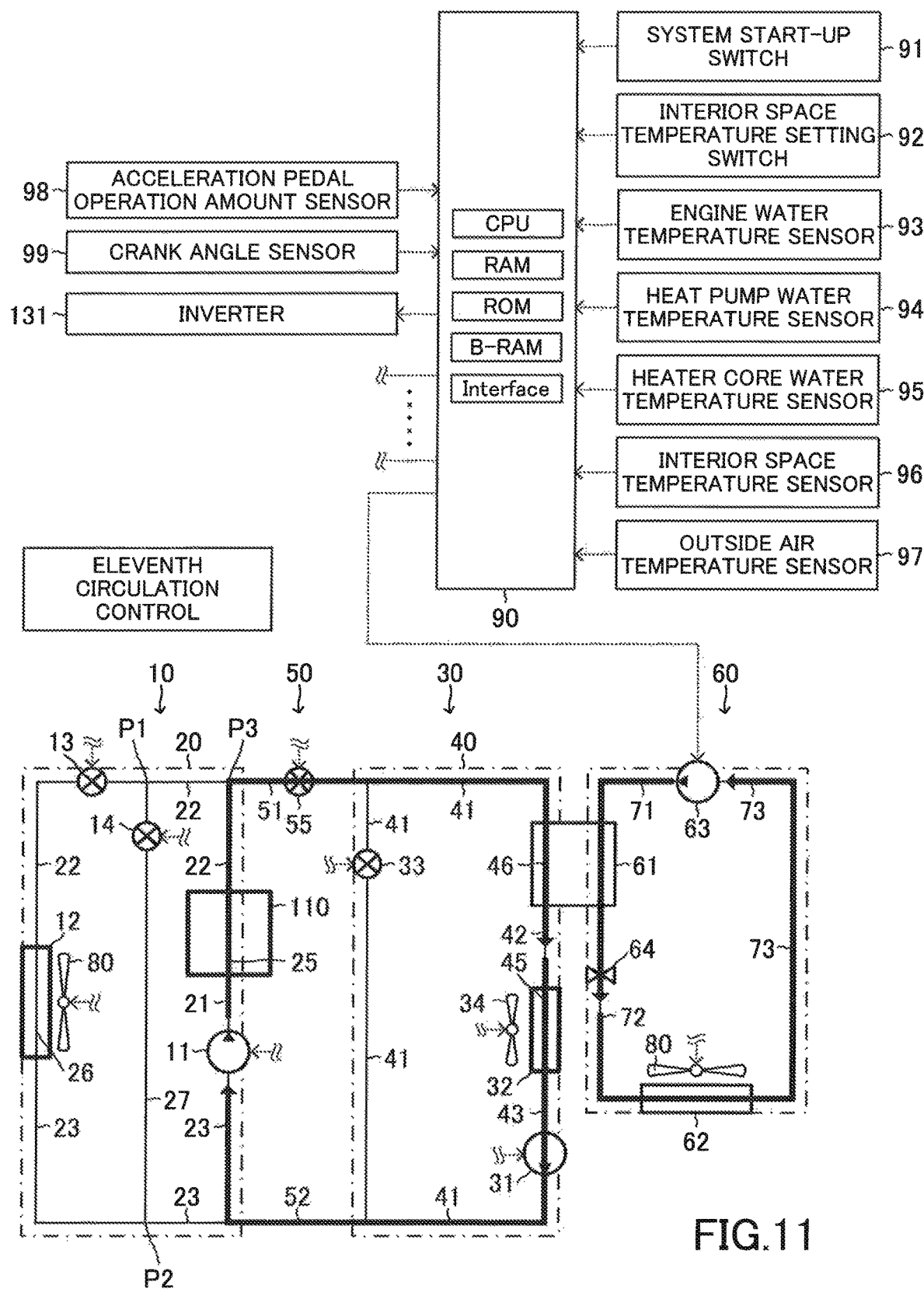
FIG. 11 is similar to FIG. 2 and which is a view for showing the flow of the cooling water and the flow of the cooling medium.

When the eleventh circulation control is executed, the cooling water and the cooling medium flows as shown by arrows in FIG. 11. The flow of the cooling water by executing the eleventh circulation control is the same as the flow of the cooling water by executing the tenth circulation control (see FIG. 10). The flow of the cooling medium by executing the eleventh circulation control is the same as the flow of the cooling medium by executing the third circulation control (see FIG. 5).

Thereby, the cooling water which cooled the engine 110 to have the increased temperature, is supplied to the condenser water passage 46. The cooling water having the increased temperature is heated by the cooling medium which was compressed by the compressor 63 to have the increased temperature, while the cooling water flows thorough the condenser water passage 46. Therefore, the temperature of the cooling water is further increased. The cooling water having the further increased temperature is supplied to the heater core water passage 45. Thus, when the temperature of the heater core 32 cannot be increased to the temperature sufficient for increasing the interior space temperature Tin to the requested interior space temperature Tin_req only by supplying the cooling water which cooled the engine 110, to the heater core water passage 45, the temperature of the heater core 32 can be increased to the temperature sufficient for increasing the interior space temperature Tin to the requested interior space temperature Tin_req. In addition, the cooling water which is not cooled by the radiator 12, is supplied to the engine internal water passage 25. Thus, the temperature of the engine 110 can be increased at the large increasing rate.

The summary of the operation of the embodiment apparatus has been described. Thereby, the amount of the fuel consumed can be reduced, and the interior space temperature Tin can be increased to the requested interior space temperature Tin_req.

<Concrete Operation of Embodiment Apparatus>

Next, a concrete operation of the embodiment apparatus will be described. The CPU of the ECU 90 of the embodiment apparatus is configured or programmed to execute a routine shown by a flowchart in FIG. 12 each time a predetermined time elapses when the system start-up switch 91 is set at the ON position.

Figure 12:
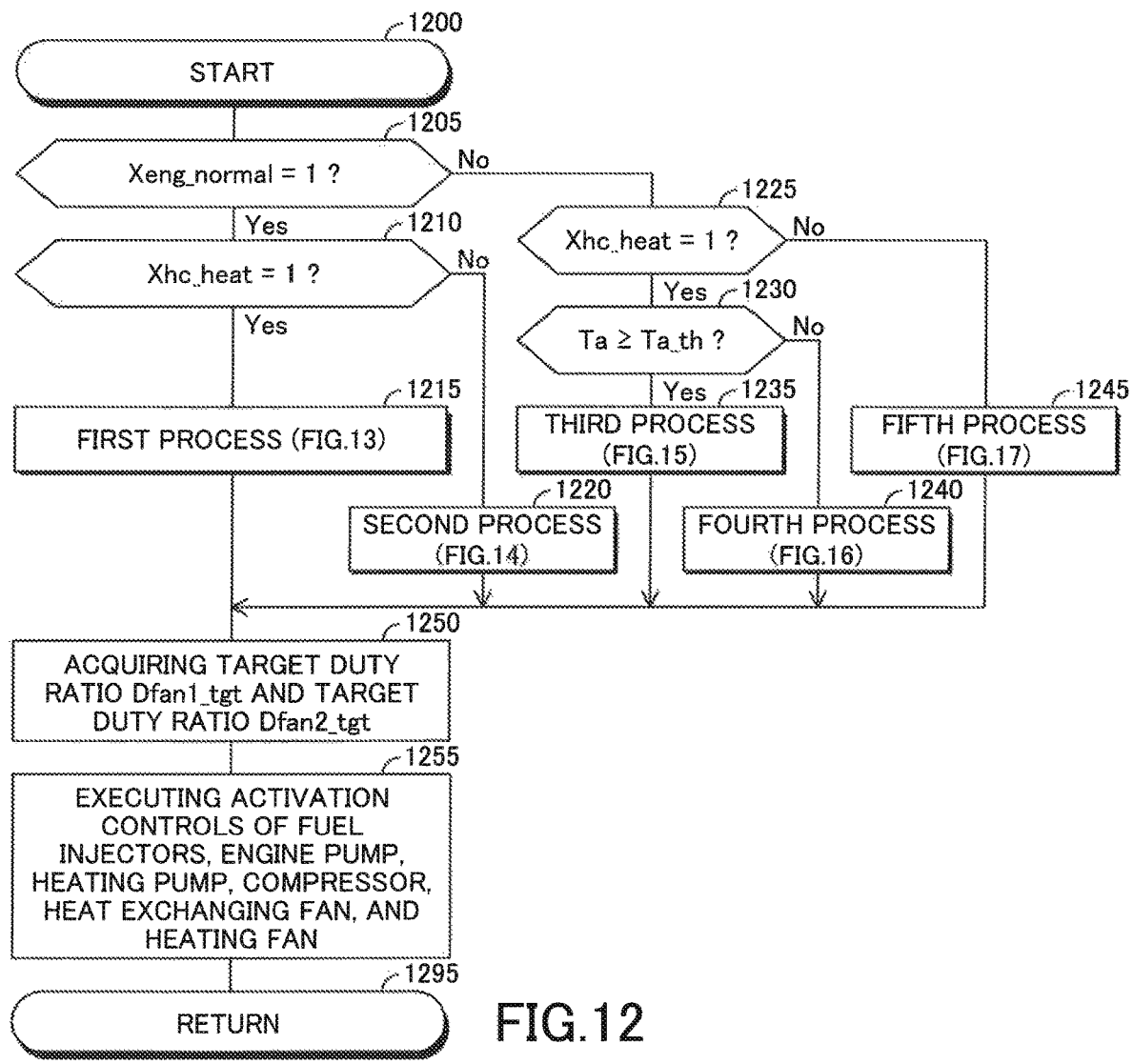
FIG. 12 is a view for showing a routine executed by a CPU of an ECU shown in FIG. 2.

Therefore, at a predetermine timing, the CPU starts a process from a step 1200 in FIG. 12 and proceeds with the process to a step 1205 to determine whether a value of a normal engine operation flag Xeng_normal is "1". The value of the normal engine operation flag Xeng_normal is set to "1" when the requested engine output power Peng_req is larger than zero and as a result, the engine operation is started. On the other hand, the value of the normal engine operation flag Xeng_normal is set to "0" when the requested engine output power Peng_req becomes zero and as a result, the engine operation is stopped.

When the value of the normal engine operation flag Xeng_normal is "1", the CPU determines "Yes" at the step 1205 and then, proceeds with the process to a step 1210 to determine whether a value of a core heating request flag Xhc_heat is "1". The value of the core heating request flag Xhc_heat is set to "1" when the process of heating the heater core 32 is requested. On the other hand, the value of the core heating request flag Xhc_heat is set to "0" when the process of heating the heater core 32 is not requested.

When the value of the core heating request flag Xhc_heat is "1", the CPU determines "Yes" at the step 1210 and then, executes a process of a step 1215. When the CPU proceeds with the process to the step 1215, the CPU executes a routine shown by a flowchart in FIG. 13.

Figure 13:
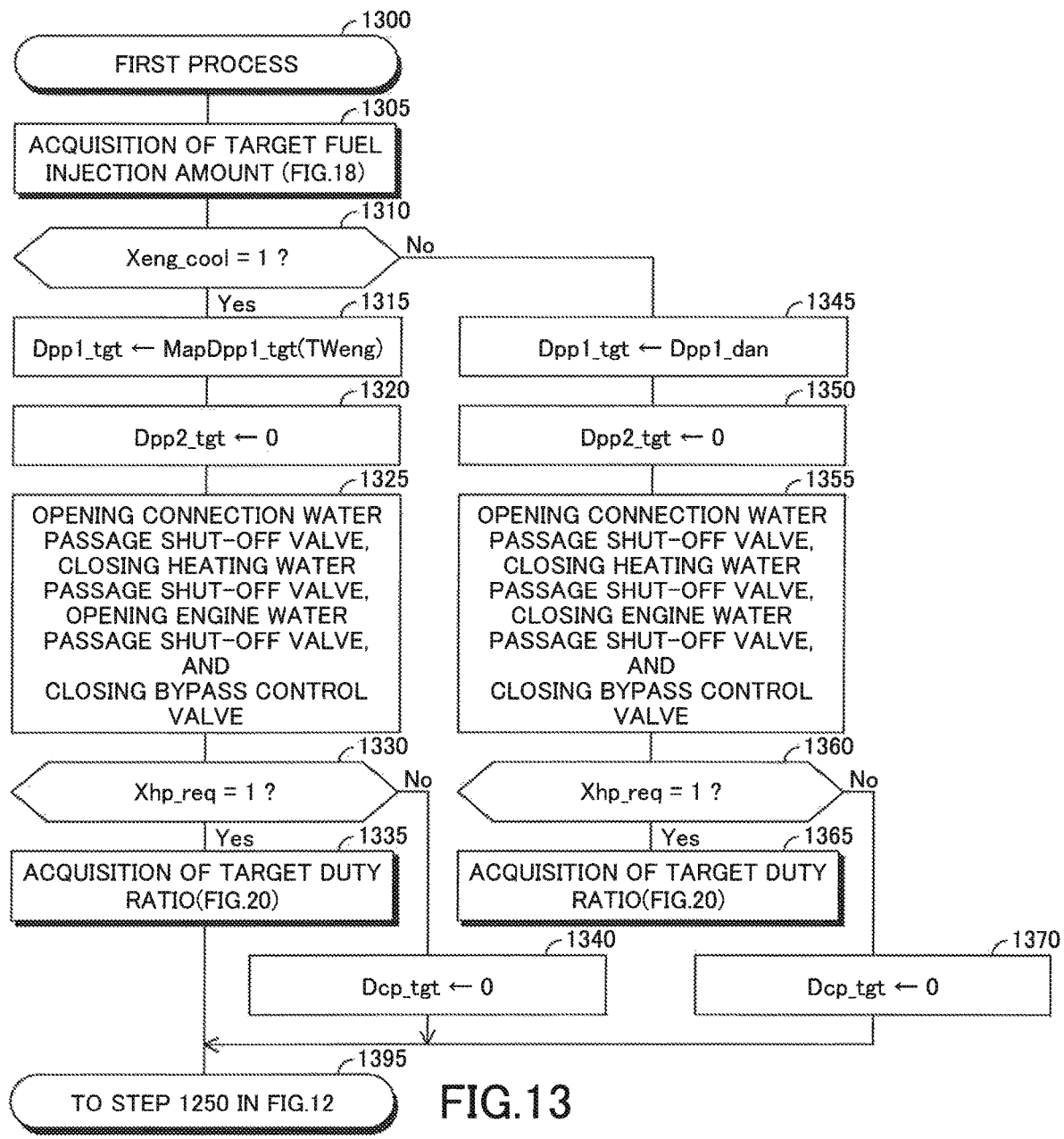
FIG. 13 is a view for showing a routine executed by the CPU.
Figure 18:
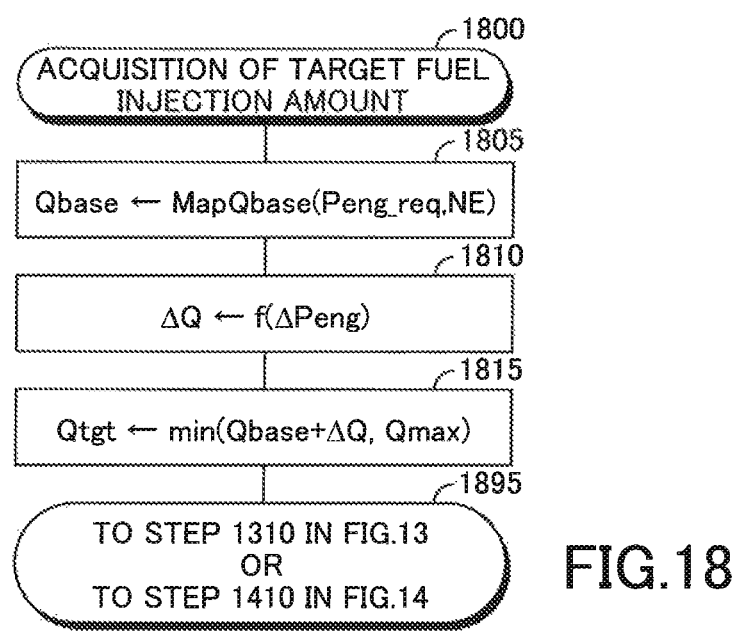
FIG. 18 is a view for showing a routine executed by the CPU.

Therefore, when the CPU proceeds with the process to the step 1215, the CPU starts a process from a step 1300 in FIG. 13 and then, proceeds with the process to a step 1305 to execute a routine shown by a flowchart in FIG. 18.

Therefore, when the CPU proceeds with the process to the step 1305, the CPU starts a process from a step 1800 in FIG. 18 and then, sequentially executes processes of steps 1805 to 1815 described below. Then, the CPU proceeds with the process to a step 1310 in FIG. 13 via a step 1895.

Step 1805: The CPU applies the requested engine output power Peng_req and the engine speed NE to a look-up table MapQbase(Peng_req,NE) to acquire a base fuel injection amount Qbase. The base fuel injection amount Qbase is a base value for calculating a target value Qtgt of a fuel injection amount. The fuel injection amount is an amount of fuel injected from each injector (not shown) of the engine 110. The base fuel injection amount Qbase acquired from the look-up table MapQbase(Peng_req) increases as the requested engine output power Peng_req increases. The base fuel injection amount Qbase acquired from the look-up table MapQbase(Peng_req) decreases as the engine speed NE increases.

Step 1810: The CPU acquires a feedback control value ΔQ for controlling an actual output power Peng of the engine 110 to the requested engine output power Peng_req promptly on the basis of a difference ΔPeng of the actual output power Peng of the engine 110 relative to the requested engine output power Peng_req.

Step 1815: The CPU acquires a smaller one of an upper limit value Qmax of an amount of fuel injected by the fuel injector and a value acquired by adding the feedback control value ΔQ to the base fuel injection amount Qbase as a target fuel injection amount Qtgt which is a target value of the fuel injection amount.

When the CPU proceeds with the process to the step 1310 in FIG. 13, the CPU determines whether a value of an engine cooling request flag Zeng_cool is "1". The value of the engine cooling request flag Xeng_cool is set to "1" when the process of cooling the engine 110 is requested. On the other hand, the value of the engine cooling request flag Xeng_cool is set to "0" when the process of cooling the engine 110 is not requested.

When the value of the engine cooling request flag Xeng_cool is "1", the CPU determines "Yes" at the step 1310 and then, sequentially executes processes of steps 1315 to 1325 described below. Then, the CPU proceeds with the process to a step 1330.

Step 1315: The CPU applies the engine water temperature TWeng to a look-up table MapDpp1_tgt(TWeng) to acquire a target value Dpp1_tgt of a duty ratio for controlling the activation of the engine pump 11. Hereinafter, the target value Dpp1_tgt will be referred to as "the target duty ratio Dpp1_tgt of the engine pump 11".

Step 1320: The CPU sets a target value Dpp2_tgt of a duty ratio for controlling the activation of the heating pump 31 to zero. Hereinafter, the target value Dpp2_tgt will be referred to as "the target duty ratio Dpp2_tgt of the heating pump 31". In this case, the activation of the heating pump 31 is stopped, or the heating pump 31 is maintained at an activation stopped state at a step 1255 in FIG. 12 described below.

Step 1325: The CPU sets the connection water passage shut-off valve 55 at the open position, sets the heating water passage shut-off valve 33 at the closed position, sets the engine water passage shut-off valve 13 at the open position, and sets the bypass control valve 14 at the closed position.

When the CPU proceeds with the process to the step 1330, the CPU determines whether a value of a heat pump activation condition flag Xhp_req is "1". The value of the heat pump activation condition flag Xhp_req is set to "1" when the heat pump activation condition is satisfied. On the other hand, the value of the heat pump activation condition flag Xhp_req is set to "0" when the heat pump activation condition is not satisfied.

Figure 20:
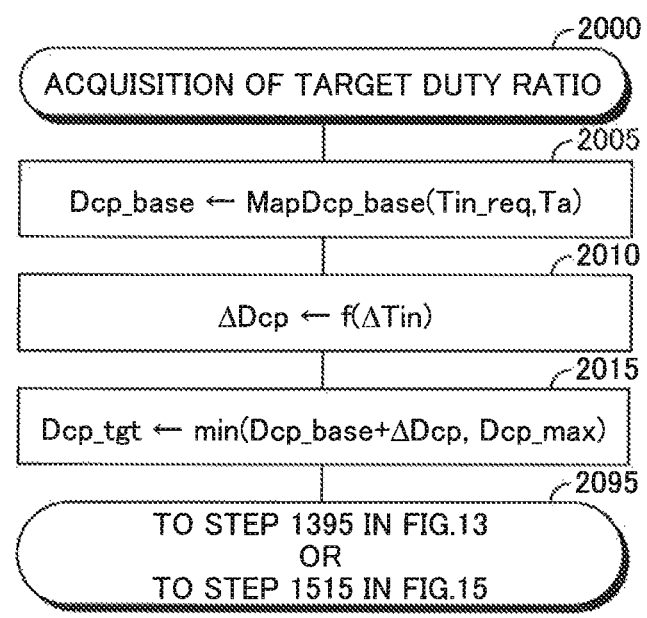
FIG. 20 is a view for showing a routine executed by the CPU.

When the value of the heat pump activation condition flag Xhp_req is "1", the CPU determines "Yes" at the step 1330 and then, proceeds with the process to a step 1335 to execute a routine shown by a flowchart in FIG. 20.

Therefore, when the CPU proceeds with the process to the step 1335, the CPU starts a process from a step 2000 in FIG. 20 and then, sequentially executes processes of steps 2005 to 2015 described below. Then, the CPU proceeds with the process to a step 1250 in FIG. 12 via a step 2095 and a step 1395 in FIG. 13.

Step 2005: The CPU applies the requested interior space temperature Tin_req and the outside air temperature Ta to a look-up table MapDcp_base(Tin_req,Ta) to acquire the base compressor duty ratio Dcp_base.

Step 2010: The CPU acquires a feedback control value ΔDcp on the basis of the interior space temperature difference ΔTin.

Step 2015: The CPU acquires a smaller one of the maximum value Dcp_max of the compressor duty ratio Dcp and a value acquired by adding the feedback control value ΔDcp to the base compressor duty ratio Dcp_base as the target compressor duty ratio Dcp_tgt.

When the value of the heat pump activation condition flag Xhp_req is "0" at a time of executing a process of the step 1330 in FIG. 13, the CPU determines "No" at the step 1330 and then, proceeds with the process to a step 1340 described below. Then, the CPU proceeds with the process to the step 1250 in FIG. 12 via the step 1395.

Step 1340: The CPU sets the target compressor duty ratio Dcp_tgt to zero. In this case, the activation of the compressor 63 is stopped, or the compressor 63 is maintained at the activation stopped state at the step 1255 in FIG. 12 described below.

When the value of the engine cooling request flag Xeng_cool is "0" at a time of executing a process of the step 1310, the CPU determines "No" at the step 1310 and then, sequentially executes processes of steps 1345 to 1355 described below. Then, the CPU proceeds with the process to a step 1360.

Step 1345: The CPU sets the target duty ratio Dpp1_tgt of the engine pump 11 to an engine warming duty ratio Dpp1_dan. The warming duty ratio Dpp1_dan is the duty ratio Dpp1 of the engine pump 11 capable of making a flow rate of the cooling water discharged from the engine pump 11 a flow rate suitable for warming the engine 110. The warming duty ratio Dpp1_dan is previously set on the basis of results of an experiment, etc.

Step 1350: The CPU sets the target duty ratio Dpp2_tgt of the heating pump 31 to zero. In this case, the activation of the heating pump 31 is stopped, or the heating pump 31 is maintained at the activation stopped state at the step 1255 in FIG. 12 described below.

Step 1355: The CPU sets the connection water passage shut-off valve 55 at the open position, sets the heating water passage shut-off valve 33 at the closed position, sets the engine water passage shut-off valve 13 at the closed position, and sets the bypass control valve 14 at the closed position.

When the CPU proceeds with the process to the step 1360, the CPU determines whether the value of the heat pump activation condition flag Xhp_req is "1". When the value of the heat pump activation condition flag Xhp_req is "1", the CPU determines "Yes" at the step 1360 and then, proceeds with the process to a step 1365 to execute the routine shown in FIG. 20 described above.

When the value of the heat pump activation condition flag Xhp_req is "0", the CPU determines "No" at the step 1360 and then, executes a process of a step 1370 described below. Then, the CPU proceeds with the process to the step 1250 in FIG. 12 via the step 1395.

Step 1370: The CPU sets the target compressor duty ratio Dcp_tgt to zero. In this case, the activation of the compressor 63 is stopped, or the compressor 63 is maintained at the activation stopped state at the step 1255 in FIG. 12 described below.

Figure 14:
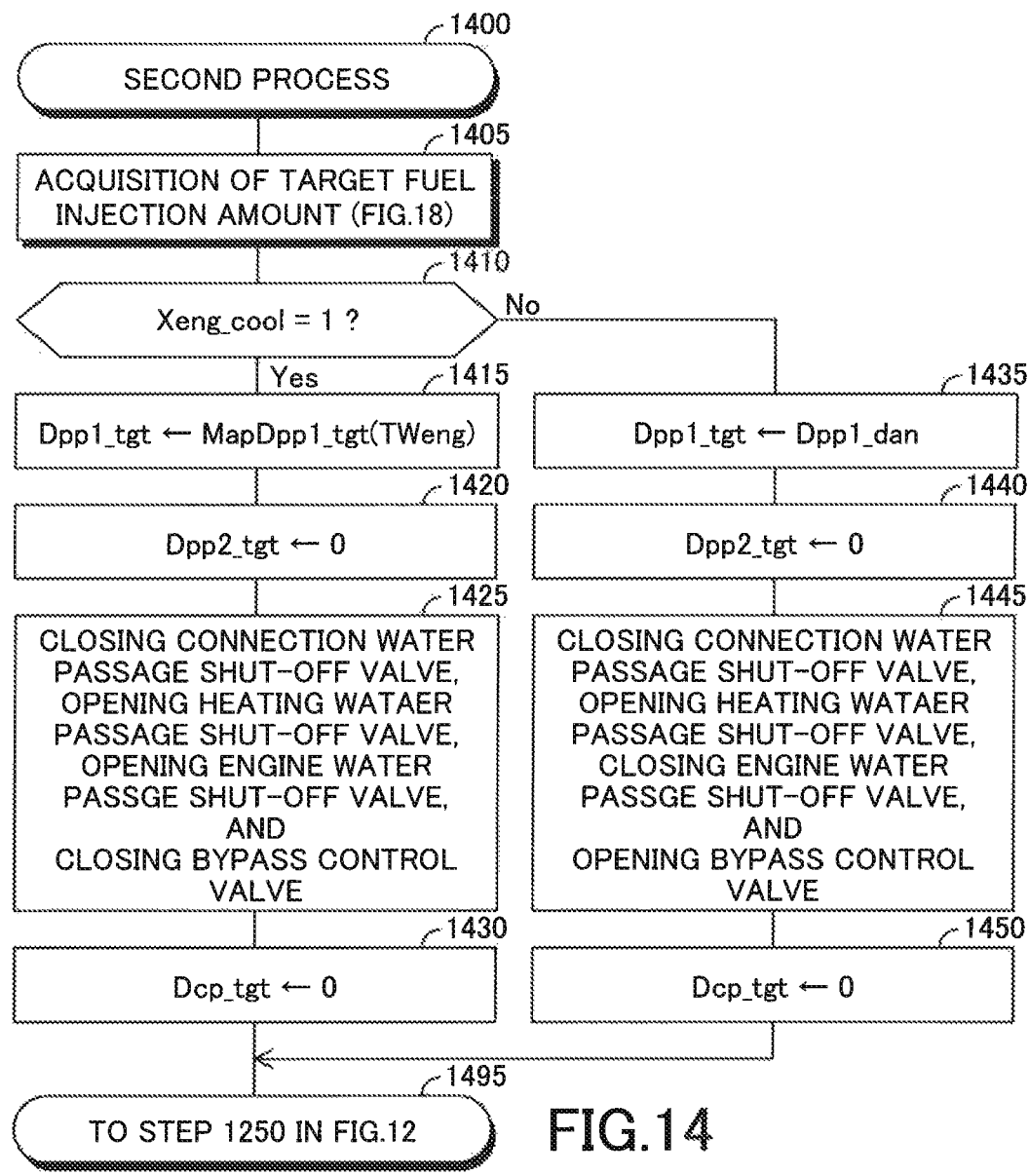
FIG. 14 is a view for showing a routine executed by the CPU.

When the value of the core heating request flag Xhc_heat is "0" at a time of executing a process of the step 1210 in FIG. 12, the CPU determines "No" at the step 1210 and then, proceeds with the process to a step 1220 to execute a routine shown by a flowchart in FIG. 14.

Therefore, when the CPU proceeds with the process to the step 1220, the CPU starts a process from a step 1400 in FIG. 14 and then, proceeds with the process to a step 1405 to execute the routine shown in FIG. 18 described above. Then, the CPU proceeds with the process to a step 1410 to determine whether the value of the engine cooling request flag Xeng_cool is "1".

When the value of the engine cooling request flag Xeng_cool is "1", the CPU determines "Yes" at the step 1410 and then, sequentially executes processes of steps 1415 to 1430 described below. Then, the CPU proceeds with the process to the step 1250 in FIG. 12 via a step 1495.

Step 1415: The CPU applies the engine water temperature TWeng to the look-up table MapDpp1_tgt(TWeng) to acquire the target duty ratio Dpp1_tgt of the engine pump 11.

Step 1420: The CPU sets the target duty ratio Dpp2_tgt of the heating pump 31 to zero. In this case, the activation of the engine pump 11 is stopped, or the engine pump 11 is maintained at the activation stopped state at the step 1255 in FIG. 12 described later.

Step 1425: The CPU sets the connection water passage shut-off valve 55 at the closed position, sets the heating water passage shut-off valve 33 at the open position, sets the engine water passage shut-off valve 13 at the open position, and sets the bypass control valve 14 at the closed position.

Step 1430: The CPU sets the target compressor duty ratio Dcp_tgt to zero. In this case, the activation of the compressor 63 is stopped, or the compressor 63 is maintained at the activation stopped state at the step 1255 in FIG. 12 described later.

When the value of the engine cooling request flag Xeng_cool is "0" at a time of executing a process of the step 1410, the CPU determines "No" at the step 1410 and then, sequentially executes processes of steps 1435 to 1450 described below. Then, the CPU proceeds with the process to the step 1250 in FIG. 12 via the step 1495.

Step 1435: The CPU sets the target duty ratio Dpp1_tgt of the engine pump 11 to the warming duty ratio Dpp1_dan.

Step 1410: The CPU sets the target duty ratio Dpp2_tgt of the heating pump 31 to zero. In this case, the activation of the heating pump 31 is stopped, or the heating pump 31 is maintained at the activation stopped state at the step 1255 in FIG. 12 described later.

Step 1445: The CPU sets the connection water passage shut-off valve 55 at the closed position, sets the heating water passage shut-off valve 33 at the open position, sets the engine water passage shut-off valve 13 at the closed position, and sets the bypass control valve 14 at the open position.

Step 1450: The CPU sets the target compressor duty ratio Dcp_tgt to zero. In this case, the activation of the compressor 63 is stopped, or the compressor 63 is maintained at the activation stopped state at the step 1255 in FIG. 12 described later.

When the value of the normal engine operation flag Xeng_normal is "0" at a time of executing a process of the step 1205 in FIG. 12, the CPU determines "No" at the step 1205 and then, proceeds with the process to a step 1225 to determine whether the value of the core heating request flag Xhc_heat is "1".

When the value of the core heating request flag Xhc_heat is "1", the CPU determines "Yes" at the step 1225 and then, proceeds with the process to a step 1230 to determine whether the outside air temperature Ta is equal to or higher than a predetermined outside air temperature Ta_th.

Figure 15:
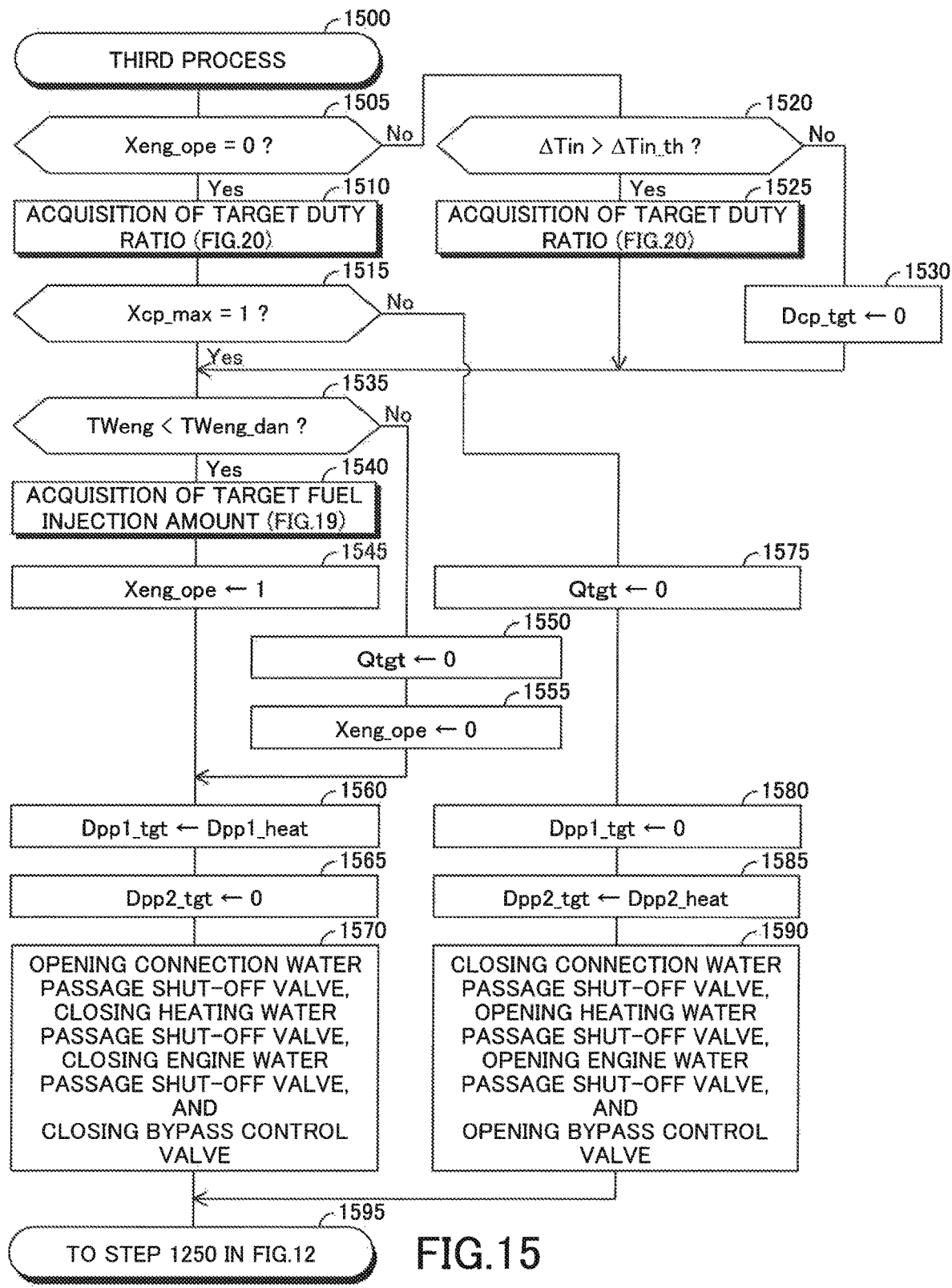
FIG. 15 is a view for showing a routine executed by the CPU.

When the outside air temperature Ta is equal to or higher than the predetermined outside air temperature Ta_th, the CPU determines "Yes" at the step 1230 and then, proceeds with the process to a step 1235 to execute a routine shown by a flowchart in FIG. 15.

Therefore, when the CPU proceeds with the process to the step 1235, the CPU starts a process from a step 1500 in FIG. 15 and then, proceeds with the process to a step 1505 to determine whether a value of a heating engine operation flag Xeng_ope is "0". The value of the heating engine operation flag Xeng_ope is set to "1" when the compressor duty ratio Dcp becomes the maximum value Dcp_max, and the engine operation is started. On the other hand, the value of the heating engine operation flag Xeng_ope is set to "0" when the engine water temperature TWeng reaches the engine warmed water temperature TWeng_dan, and the engine operation is stopped.

When the value of the heating engine operation flag Xeng_ope is "0", the CPU determines "Yes" at the step 1505 and then, proceeds with the process to a step 1510 to execute the routine shown in FIG. 20 described above.

Then, the CPU proceeds with the process to a step 1515 to determine whether a value of a maximum duty ratio flag Xcp_max is "1". The value of the maximum duty ratio flag Xcp_max is set to "1" when the compressor duty ratio Dcp reaches the maximum value Dcp_max. On the other hand, the value of the maximum duty ratio flag Xcp_max is set to "0" when the engine water temperature TWeng reaches the engine warmed water temperature TWeng_dan. In this embodiment, the CPU determines that the compressor duty ratio Dcp reaches the maximum value Dcp_max when the target compressor duty ratio Dcp_tgt reaches the maximum value Dcp_max.

When the value of the maximum duty ratio flag Xcp_max is "1", the CPU determines "Yes" at the step 1515 and then, proceeds with the process to a step 1535.

When the value of the heating engine operation flag Xeng_ope is "1" at a time of executing a process of the step 1505, the CPU determines "No" at the step 1505 and then, proceeds with the process to a step 1520 to determine whether the interior space temperature difference ΔTin is larger than the predetermined interior space temperature difference ΔTin_th.

When the interior space temperature difference ΔTin is larger than the predetermined interior space temperature difference ΔTin_th, the CPU determines "Yes" at the step 1520 and then, proceeds with the process to a step 1525 to execute the routine shown in FIG. 20 described above. Then, the CPU proceeds with the process to the step 1535.

When the interior space temperature difference ΔTin is equal to or smaller than the predetermined interior space temperature difference ΔTin_th, the CPU determines "No" at the step 1520 and then, executes a process of a step 1530 described below. Then, the CPU proceeds with the process to the step 1535.

Step 1530: The CPU sets the target compressor duty ratio Dcp_tgt to zero. In this case, the activation of the compressor 63 is stopped, or the compressor 63 is maintained at the activation stopped state at the step 1255 in FIG. 12 described later.

When the CPU proceeds with the process to the step 1535, the CPU determines whether the engine water temperature TWeng is lower than the engine warmed water temperature TWeng_dan. When the engine water temperature TWeng is lower than the engine warmed water temperature TWeng_dan, the CPU determines "Yes" at the step 1535 and then, proceeds with the process to a step 1540 to execute a routine shown by a flowchart in FIG. 19.

Therefore, when the CPU proceeds with the process to the step 1540, the CPU starts a process from a step 1900 in FIG. 19 and then, sequentially executes processes of steps 1905 to 1915 described below. Then, the CPU proceeds with the process to a step 1545 in FIG. 15 via a step 1995.

Step 1905: The CPU applies the requested interior space temperature Tin_req to a look-up table MapQbase(Tin_req) to acquire the base fuel injection amount Qbase. The base fuel injection amount Qbase acquired from the look-up table MapQbase(Tin_req) increases as the requested interior space temperature Tin_req increases.

Step 1910: The CPU acquires the feedback control value ΔQ on the basis of the interior space temperature difference ΔTin.

Step 1915: The CPU acquires a smaller one of the maximum value Qmax of the fuel injection amount Q and the value acquired by adding the feedback control value ΔQ to the base fuel injection amount Qbase as the target fuel injection amount Qtgt.

When the CPU proceeds with the process to the step 1545, the CPU sets the heating engine operation flag Xeng_ope to "1". Then, the CPU sequentially executes processes of steps 1560 to 1570 described below. Then, the CPU proceeds with the process to the step 1250 in FIG. 12 via a step 1595.

Step 1560: The CPU sets the target duty ratio Dpp1_tgt of the engine pump 11 to a heating duty ratio Dpp1_heat. The heating duty ratio Dpp1_heat is the duty ratio Dpp1 of the engine pump 11 capable of making the flow rate of the cooling water discharged from the engine pump 11 a flow rate suitable for heating the heater core 32. The heating duty ratio Dpp1_heat is previously set on the basis of results of an experiment, etc.

Step 1565: The CPU sets the target duty ratio Dpp2_tgt of the heating pump 31 to zero. In this case, the activation of the heating pump 31 is stopped, or the heating pump 31 is maintained at the activation stopped state at the step 1255 in FIG. 12 described later.

Step 1570: The CPU sets the connection water passage shut-off valve 55 at the open position, sets the heating water passage shut-off valve 33 at the closed position, sets the engine water passage shut-off valve 13 at the closed position, and sets the bypass control valve 14 at the closed position.

When the engine water temperature TWeng is equal to or higher than the engine warmed water temperature TWeng_dan at a time of executing a process of the step 1535, the CPU determines "No" at the step 1535 and then, sequentially executes processes of steps 1550 and 1555 described below.

Step 1550: The CPU sets the target fuel injection amount Qtgt to zero. In this case, an injection of the fuel by the fuel injectors is not performed at the step 1255 in FIG. 12 described later. Therefore, the engine operation is stopped, or the engine 110 is maintained at an operation stopped state. The operation stopped state is a state that the engine operation is stopped.

Step 1555: The CPU sets the value of the heating engine operation flag Xeng_ope to "0".

Then, the CPU sequentially executes the processes of the steps 1560 to 1570 described above. Then, the CPU proceeds with the process to the step 1250 in FIG. 12 via the step 1595.

When the value of the maximum duty ratio flag Xcp_max is "0" at a time of executing a process of the step 1515, the CPU determines "No" at the step 1515 and then, sequentially executes processes of steps 1575 to 1590 described below. Then, the CPU proceeds with the process to the step 1250 in FIG. 12 via the step 1595.

Step 1575: The CPU sets the target fuel injection amount Qtgt to zero. In this case, the injection of the fuel by the fuel injectors is not performed at the step 1255 in FIG. 12 described later. Therefore, the engine operation is stopped, or the engine 110 is maintained at the operation stopped state.

Step 1580: The CPU sets the target duty ratio Dpp1_tgt of the engine pump 11 to zero. In this case, the activation of the engine pump 11 is stopped, or the engine pump 11 is maintained at the activation stopped state at the step 1255 in FIG. 12 described later.

Step 1585: The CPU sets the target duty ratio Dpp2_tgt of the heating pump 31 to a heating duty ratio Dpp2_heat. The heating duty ratio Dpp2_heat is the duty ratio Dpp2 of the heating pump 31 capable of making the flow rate of the cooling water discharged from the heating pump 31 a flow rate suitable for heating the heater core 32. The heating duty ratio Dpp2_heat is previously set on the basis of results of an experiment, etc.

Step 1590: The CPU sets the connection water passage shut-off valve 55 at the closed position, sets the heating water passage shut-off valve 33 at the open position, sets the engine water passage shut-off valve 13 at the open position, and sets the bypass control valve 14 at the open position.

Figure 16:
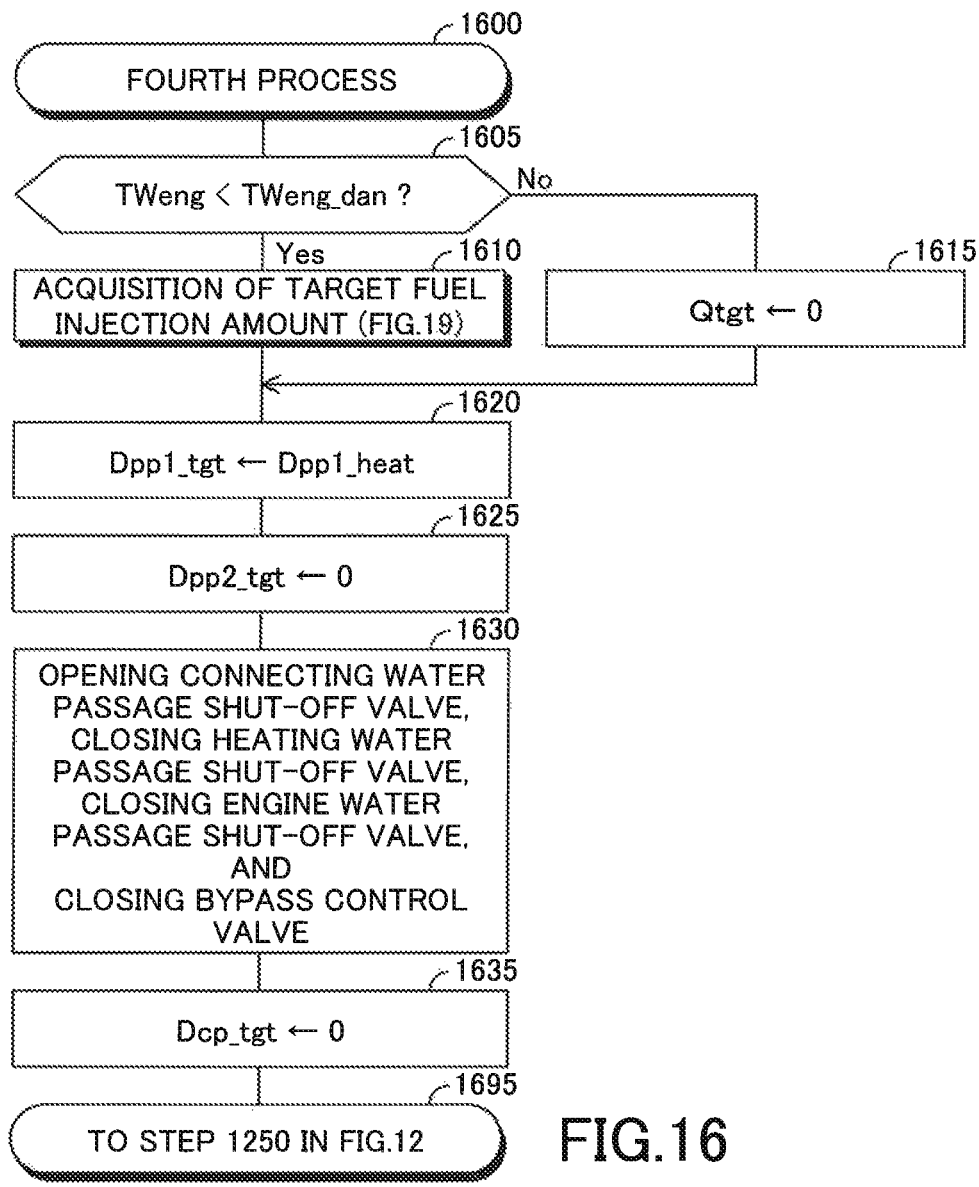
FIG. 16 is a view for showing a routine executed by the CPU.

When the outside air temperature Ta is lower than the predetermined outside air temperature Ta_th at a time of executing a process of the step 1230 in FIG. 12, the CPU determines "No" at the step 1230 and then, proceeds with the process to a step 1240 to execute a routine shown by a flowchart in FIG. 16.

Therefore, when the CPU proceeds with the process to the step 1240, the CPU starts a process from a step 1600 in FIG. 16 and then, proceeds with the process to a step 1605 to determine whether the engine water temperature TWeng is lower than the engine warmed water temperature TWeng_dan.

Figure 19:
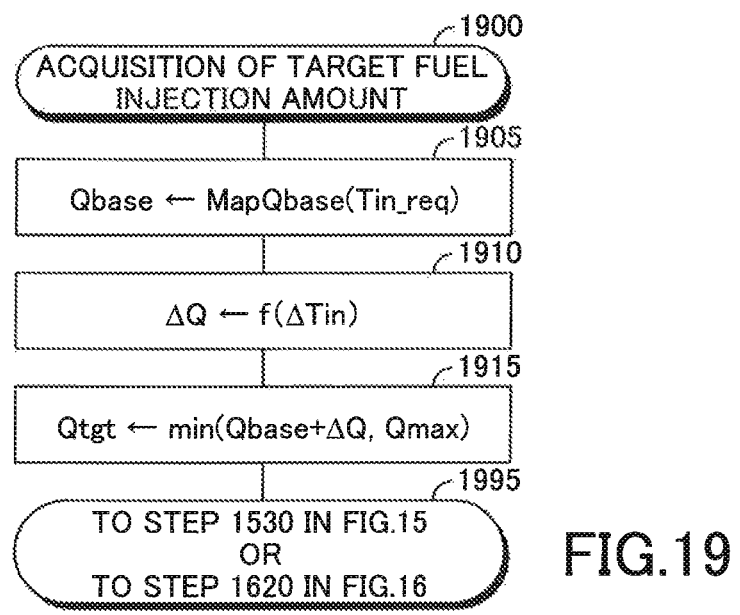
FIG. 19 is a view for showing a routine executed by the CPU.

When the engine water temperature TWeng is lower than the engine warmed water temperature TWeng_dan, the CPU determines "Yes" at the step 1605 and then, proceeds with the process to a step 1610 to execute the routine shown in FIG. 19 described above. Then, the CPU sequentially executes processes of steps 1620 to 1630 described below. Then, the CPU proceeds with the process to the step 1250 in FIG. 12 via a step 1695.

Step 1620: The CPU sets the target duty ratio Dpp1_tgt of the engine pump 11 to the heating duty ratio Dpp1_heat.

Step 1625: The CPU sets the target duty ratio Dpp2_tgt of the heating pump 31 to zero. In this case, the activation of the heating pump 31 is stopped, or the heating pump 31 is maintained at the activation stopped state at the step 1255 in FIG. 12 described later.

Step 1630: The CPU sets the connection water passage shut-off valve 55 at the open position, sets the heating water passage shut-off valve 33 at the closed position, sets the engine water passage shut-off valve 13 at the closed position, and sets the bypass control valve 14 at the closed position.

Step 1635: The CPU sets the target compressor duty ratio Dcp_tgt to zero. In this case, the activation of the compressor 63 is stopped, or the compressor 63 is maintained at the activation stopped state at the step 1255 in FIG. 12 described later.

When the engine water temperature TWeng is equal to or higher than the engine warmed water temperature TWeng_dan at a time of executing a process of the step 1605, the CPU determines "No" at the step 1605 and then, executes a process of a step 1615 described below. Then, the CPU sequentially executes the processes of the steps 1620 to 1635 described above. Then, the CPU proceeds with the process to the step 1250 in FIG. 12 via the step 1695.

Step 1615: The CPU sets the target fuel injection amount Qtgt to zero. In this case, the injection of the fuel by the fuel injectors is not performed at the step 1255 in FIG. 12 described later. Therefore, the engine operation is stopped, or the engine 110 is maintained at the operation stopped state.

Figure 17:
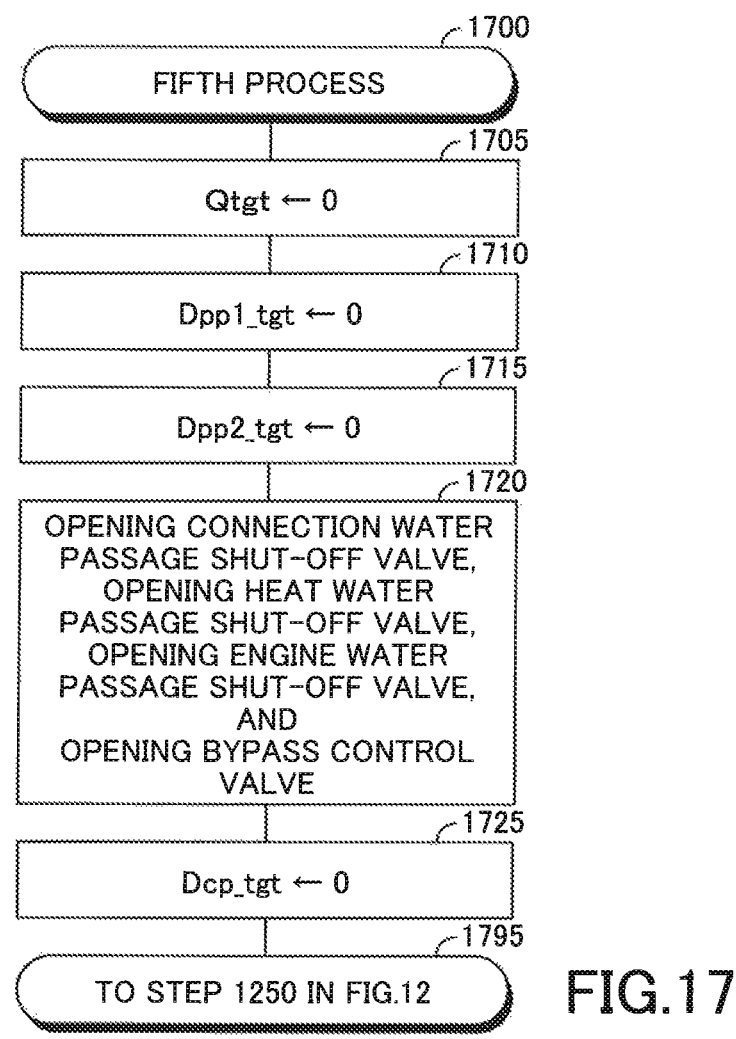
FIG. 17 is a view for showing a routine executed by the CPU.

When the value of the core heating request flag Xhc_heat is "0" at a time of executing a process of the step 1225 in FIG. 12, the CPU determines "No" at the step 1225 and then, proceeds with the process to a step 1245 to execute a routine shown by a flowchart in FIG. 17.

Therefore, when the CPU proceeds with the process to the step 1245, the CPU starts a process from a step 1700 in FIG. 17 and then, sequentially executes processes of steps 1705 to 1725. Then, the CPU proceeds with the process to the step 1250 in FIG. 12 via a step 1795.

Step 1705: The CPU sets the target fuel injection amount Qtgt to zero. In this case, the injection of the fuel by the fuel injectors is not performed at the step 1255 in FIG. 12 described later. Therefore, the engine operation is stopped, or the engine 110 is maintained at the operation stopped state.

Step 1710: The CPU sets the target duty ratio Dpp1_tgt of the engine pump 11 to zero. In this case, the activation of the engine pump 11 is stopped, or the engine pump 11 is maintained at the activation stopped state at the step 1255 in FIG. 12 described later.

Step 1715: The CPU sets the target duty ratio Dpp2_tgt of the heating pump 31 to zero. In this case, the activation of the heating pump 31 is stopped, or the heating pump 31 is maintained at the activation stopped state at the step 1255 in FIG. 12 described later.

Step 1720: The CPU sets the connection water passage shut-off valve 55, the heating water passage shut-off valve 33, the engine water passage shut-off valve 13, and the bypass control valve 14 at the open positions, respectively.

Step 1725: The CPU sets the target compressor duty ratio Dcp_tgt to zero. In this case, the activation of the compressor 63 is stopped, or the compressor 63 is maintained at the activation stopped state at the step 1255 in FIG. 12 described later.

When the CPU proceeds with the process to the step 1250 in FIG. 12, the CPU acquires a target value Dfan1_tgt of a duty ratio for controlling the activation of the heat exchanging fan 80 and a target value Dfan2_tgt of a duty ratio for controlling the activation of the heating fan 34. Hereinafter, the target value Dfan1_tgt will be referred to as "the target duty ratio Dfan1_tgt of the heat exchanging fan 80", and the target value Dfan2_tgt will be referred to as "the target duty ratio Dfan2_tgt of the heating fan 34".

The target duty ratio Dfan1_tgt of the heat exchanging fan 80 is set to a predetermined value larger than zero when the cooling water is supplied to the radiator water passage 26. The target duty ratio Dfan1_tgt of the heat exchanging fan 80 is also set to the predetermined value when the compressor 63 is activated. The target duty ratio Dfan1_tgt is set to zero when the cooling water is not supplied to the radiator water passage 26, and the compressor 63 is not activated.

The target duty ratio Dfan2_tgt of the heating fan 34 is set to a predetermined value larger than zero when the cooling water is supplied to the heater core water passage 45. The target duty ratio Dfan2_tgt is set to zero when the cooling water is not supplied to the heater core water passage 45.

Next, the CPU executes a process of the step 1255 described below. Then, the CPU proceeds with the process to a step 1295 to terminate this routine once.

Step 1255: The CPU controls the activations of the fuel injectors, the engine pump 11, the heating pump 31, the compressor 63, the heat exchanging fan 80, and the heating fan 34. In this case, the CPU controls the activation of each fuel injector so as to accomplish the currently-set target fuel injection amount Qtgt. Further, the CPU controls the activation of the engine pump 11 to control the duty ratio Dpp1 of the engine pump 11 to the currently-set target duty ratio Dpp1_tgt. Further, the CPU controls the activation of the heating pump 31 to control the duty ratio Dpp2 of the heating pump 31 to the currently-set target duty ratio Dpp2_tgt. Further, the CPU controls the activation of the compressor 63 to control the compressor duty ratio Dcp to the currently-set target duty ratio Dcp_tgt. Further, the CPU controls the activation of the heat exchanging fan 80 to control the duty ratio Dfan1 of the heat exchanging fan 80 to the currently-set target duty ratio Dfan1_tgt. Further, the CPU controls the activation of the heating fan 34 to control the duty ratio Dfan2 of the heating fan 34 to the currently-set target duty ratio Dfan2_tgt.

The concrete operation of the embodiment apparatus has been described. Thereby, when the engine water temperature TWeng reaches the engine warmed water temperature TWeng_dan (see a determination "No" at the step 1535 in FIG. 15) after the compressor duty ratio Dcp reaches the maximum value Dcp_max and thus, the engine operation is started (see a determination "Yes" at the step 1515 in FIG. 15 and the process of the step 1540 in FIG. 15), the engine operation is stopped (see the process of the step 1550 in FIG. 15). Thus, the heater core 32 can be heated with a small fuel consumption.

It should be noted that the present invention is not limited to the aforementioned embodiment and various modifications can be employed within the scope of the present invention.

For example, the embodiment apparatus starts the engine operation when the compressor duty ratio Dcp reaches the maximum value Dcp_max while the embodiment apparatus executes the fourth circulation control. In this case, the cooling water having the temperature increased by cooling the engine 110, is supplied to the condenser water passage 46. Thus, the temperature of the cooling water supplied to the heater core water passage 45, is increased. Thus, the interior space temperature difference ΔTin decreases gradually. Thus, the target compressor duty ratio Dcp_tgt decreases gradually.

In this regard, the embodiment apparatus may be configured to maintain the target compressor duty ratio Dcp_tgt of the compressor 63 at the maximum value Dcp_max until the embodiment apparatus stops the engine operation when the compressor duty ratio Dcp reaches the maximum value Dcp_max and thus, the embodiment apparatus starts the engine operation while the embodiment apparatus executes the fourth circulation control.

Thereby, the cooling water having the higher temperature can be supplied to the heater core water passage 45. Therefore, a time required for the interior space temperature Tin to reach the requested interior space temperature Tin_req, can be reduced. Thus, a condition for stopping the engine operation may be satisfied early. Thus, the small fuel consumption can be accomplished.

Figure 21:
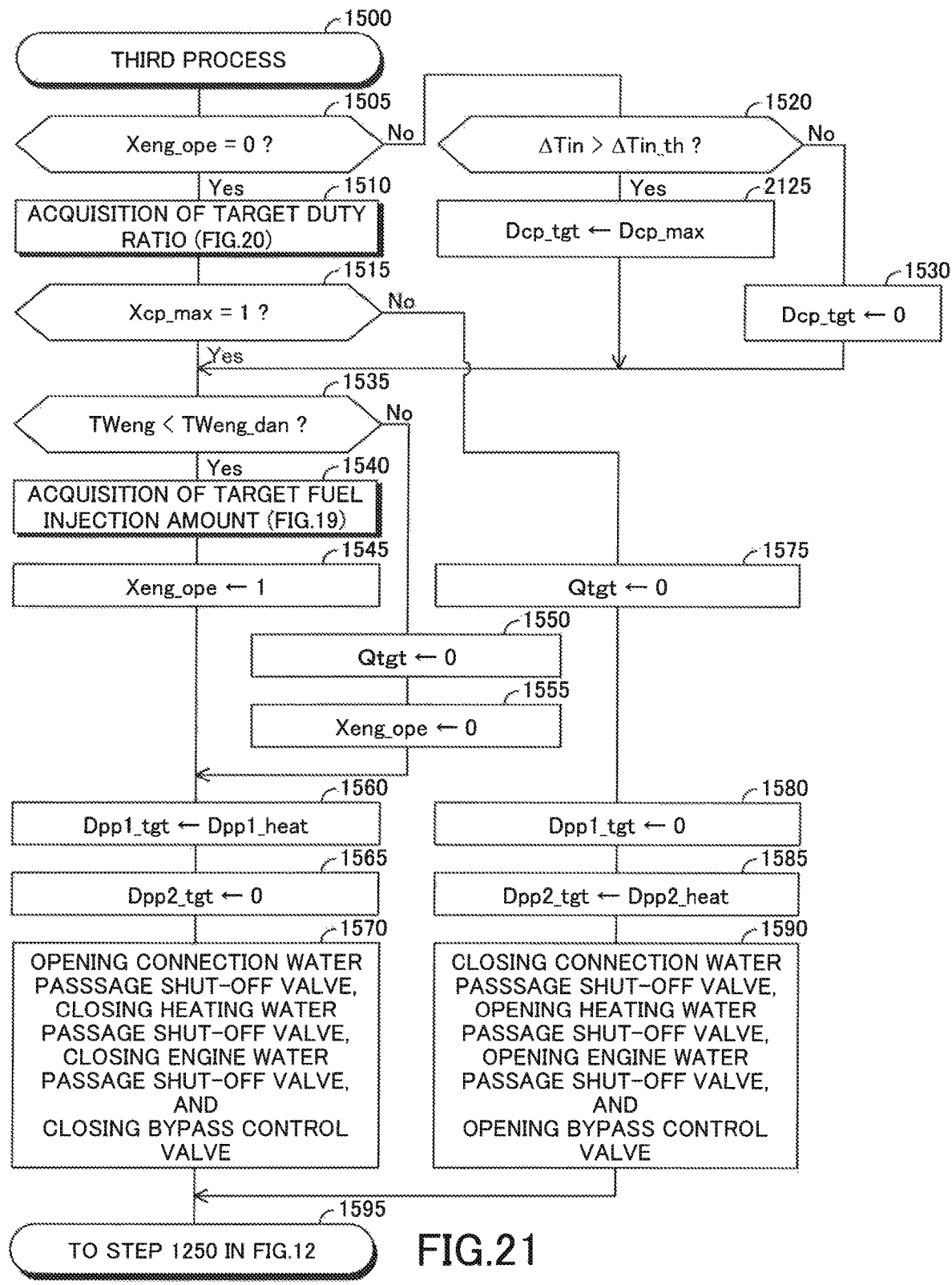
FIG. 21 is a view for showing a routine executed by the CPU.

The CPU of the ECU 90 of the such configured embodiment apparatus executes a routine shown by a flowchart in FIG. 21 in place of executing the routine shown in FIG. 15. The routine shown in FIG. 21 is the same as the routine shown in FIG. 15 except that the CPU executes a process of a step 2125 in place of the process of the step 1525 when the CPU determines "Yes" at the step 1520. When the CPU proceeds with the process to the step 2125, the CPU sets the target compressor duty ratio Dcp_tgt and then, proceeds with the process to the step 1535.

Further, in case that the embodiment apparatus includes a sensor for detecting the heater core temperature Thc, the embodiment apparatus may be configured to use the heater core temperature Thc in place of the interior space temperature Tin. Further, in case that the embodiment apparatus does not include the sensor for detecting the heater core temperature Thc, the embodiment apparatus may be configured to use the heater core inlet water temperature TWhc_in or the heater core outlet water temperature TWhc_out as a parameter representing the heater core temperature Thc.

When the embodiment apparatus uses the heater core temperature Thc in place of the interior space temperature Tin, the embodiment apparatus uses the requested heater core temperature Thc_req in place of the requested interior space temperature Tin_req. As described above, the requested heater core temperature Thc_req is the heater core temperature Thc required to increase the interior space temperature Tin to the requested interior space temperature Tin_req.

Further, when the embodiment apparatus uses the heater core inlet water temperature TWhc_in as the parameter representing the heater core temperature Thc, the embodiment apparatus uses a requested heater core inlet water temperature TWhc_in_req as a parameter representing the requested heater core temperature Thc_req. The requested heater core inlet water temperature TWhc_in_req is the heater core inlet water temperature TWhc_in capable of increasing the heater core temperature Thc to the requested heater core temperature Thc_req.

Further, when the embodiment apparatus uses the heater core outlet water temperature TWhc_out as the parameter representing the heater core temperature Thc, the embodiment apparatus uses a requested heater core outlet water temperature TWhc_out_req as the parameter representing the requested heater core temperature Thc_req. The requested heater core outlet water temperature TWhc_out_req is the heater core outlet water temperature TWhc_out capable of increasing the heater core temperature Thc to the requested heater core temperature Thc_req.

Further, the embodiment apparatus uses the engine warmed water temperature TWeng_dan when the embodiment apparatus executes the sixth circulation control. In this regard, the embodiment apparatus may be configured to use a water temperature higher or lower than the engine warmed water temperature TWeng_dan, that is, around the engine warmed water temperature TWeng_dan in place of the engine warmed water temperature TWeng_dan.

Further, the embodiment apparatus uses the heat pump 60 as a heat generation device for heating the cooling water supplied to the heater core water passage 45. In this regard, the embodiment apparatus may use a known electric heater as the heat generation device in place of the heat pump 60.

What is claimed is:

1. A vehicle heating apparatus for heating an interior space of a vehicle, comprising:
    a heater core for heating an air to be supplied to the interior space;
    a heat generation device for generating heat by using electric power;
    at least one pump for flowing cooling water; and
    an electronic control unit for controlling an activation of the heat generation device, an operation of an internal combustion engine of the vehicle, and an activation of the at least one pump,
    wherein the electronic control unit is configured to:
      execute a first heating control for activating the heat generation device to heat the heater core by the heat generated by the heat generation device when a process of heating the heater core is requested while the operation of the internal combustion engine is stopped;
      execute a second heating control for activating the heat generation device, operating the internal combustion engine, and activating the at least one pump to heat the cooling water which cooled the internal combustion engine, by the heat generated by the heat generation device, supply the heated cooling water to the heater core, and heat the heater core by the supplied cooling water when a temperature of the heater core is not increased to a requested temperature only by the heat generated by the heat generation device;
      execute a third heating control for continuing the activation of the heat generation device, stopping the operation of the internal combustion engine, and continuing the activation of the at least one pump to heat the cooling water which cooled the internal combustion engine, by the heat generated by the heat generation device, supply the heated cooling water to the heater core, and heat the heater core by the supplied cooling water when a temperature of the internal combustion engine becomes equal to or higher than a predetermined temperature while the electronic control unit executes the second heating control.

2. The vehicle heating apparatus as set forth in claim 1, wherein the predetermined temperature is set to a temperature equal to or higher than the temperature of the internal combustion engine which is warmed completely.

3. The vehicle heating apparatus as set forth in claim 1, wherein the electronic control unit is configured to:
    set a target output power of the heat generation device on the basis of a difference of the temperature of the heater core relative to the requested temperature when the electronic control unit executes the first heating control; and
    maintain the target output of the heat generation device at a constant value while the electronic control unit executes the second heating control.

4. The vehicle heating apparatus as set forth in claim 1, wherein the vehicle heating apparatus comprises a heat pump including a compressor as the heat generation device, the electronic control unit is configured to:
    execute the first heating control for activating the compressor to cause the heat pump to generate the heat and heat the heater core by the heat generated by the heat pump when the process of heating the heater core is requested, and an outside air temperature is equal to or higher than a predetermined outside air temperature while the operation of the internal combustion engine; and
    execute a fourth heating control for operating the internal combustion engine and activating the at least one pump to supply the cooling water which cooled the internal combustion engine, to the heater core and heat the heater core by the supplied cooling water when the process of heating the heater core is requested, and the outside air temperature is lower than the predetermined outside air temperature while the operation of the internal combustion engine is stopped.

5. The vehicle heating apparatus as set forth in claim 4, wherein the electronic control unit is configured to stop the activation of the compressor when the electronic control unit executes the fourth heating control.

6. The vehicle heating apparatus as set forth in claim 1, wherein the electronic control unit is configured to stop the activation of the heat generation device when the difference of the temperature of the heater core relative to the requested temperature becomes equal to or smaller than a predetermined temperature difference after the electronic control unit starts to execute the third heating control.

7. The vehicle heating apparatus as set forth in claim 1, wherein the electronic control unit is configured to activate the at least one pump to heat the cooling water by the heat generated by the heat generation device, supply the heated cooling water to the heater core, and heat the heater core by the supplied cooling water when the electronic control unit executes the first heating control.

8. The vehicle heating apparatus as set forth in claim 1, wherein the vehicle heating apparatus comprises:

an engine water circulation passage for flowing the cooling water supplied to the internal combustion engine;
a heating water circulation passage for flowing the cooling water supplied to the heater core; and
a connection device for connecting the engine water circulation passage to the heating water circulation passage, and
the electronic control unit is configured to control an activation of the connection device to connect the engine water circulation passage to the heating water circulation passage when the electronic control unit executes the first heating control, the second heating control, and the third heating control, respectively.

9. The vehicle heating apparatus as set forth in claim 4, wherein the vehicle heating apparatus comprises:
an engine water circulation passage for flowing the cooling water supplied to the internal combustion engine;
a heating water circulation passage for flowing the cooling water supplied to the heater core; and
a connection device for connecting the engine water circulation passage to the heating water circulation passage, and
the electronic control unit is configured to control an activation of the connection device to connect the engine water circulation passage to the heating water circulation passage when the electronic control unit executes the fourth heating control.

10. The vehicle heating apparatus as set forth in claim 8, wherein the at least one pump is provided in the engine water circulation passage.

11. The vehicle heating apparatus as set forth in claim 8, wherein the at least one pump is provided in the heating water circulation passage.

12. The vehicle heating apparatus as set forth in claim 11, wherein the vehicle heating apparatus comprises another pump provided in the engine water circulation passage for flowing the cooling water.

* * * * *